United States Patent
Kumaki

(10) Patent No.: US 7,636,106 B2
(45) Date of Patent: Dec. 22, 2009

(54) IMAGE PROCESSING APPARATUS AND METHOD, AND PROGRAM USED THEREWITH

(75) Inventor: Jinyo Kumaki, Tokyo (JP)

(73) Assignee: Sony Corporation, Tokyo (JP)

( * ) Notice: Subject to any disclaimer, the term of this patent is extended or adjusted under 35 U.S.C. 154(b) by 449 days.

(21) Appl. No.: 11/557,645

(22) Filed: Nov. 8, 2006

(65) Prior Publication Data

US 2007/0115364 A1    May 24, 2007

(30) Foreign Application Priority Data

Nov. 11, 2005   (JP) ............... 2005-327370

(51) Int. Cl.
  *H04N 5/228*   (2006.01)
  *G06K 9/40*    (2006.01)
(52) U.S. Cl. .............. 348/208.4; 348/208.1; 348/208.2; 348/208.6; 348/208.99; 382/275
(58) Field of Classification Search ............... 348/208.6
  See application file for complete search history.

(56) References Cited

U.S. PATENT DOCUMENTS

| | | | | |
|---|---|---|---|---|
| 5,060,074 A | * | 10/1991 | Kinugasa et al. | 348/208.6 |
| 5,249,037 A | * | 9/1993 | Sugiyama et al. | 348/452 |
| 5,650,819 A | * | 7/1997 | Sato et al. | 348/240.99 |
| 6,122,446 A | * | 9/2000 | Satoh | 396/52 |
| 6,801,250 B1 | * | 10/2004 | Miyashita | 348/220.1 |
| 7,436,984 B2 | * | 10/2008 | Auberger | 382/107 |
| 2004/0218056 A1 | * | 11/2004 | Nomura et al. | 348/208.6 |

FOREIGN PATENT DOCUMENTS

| | | |
|---|---|---|
| JP | 2-150180 | 6/1990 |
| JP | 11-4379 | 1/1999 |
| JP | 2002-142179 | 5/2002 |
| JP | 2002-359768 | 12/2002 |
| JP | 2005-175581 | 6/2005 |

* cited by examiner

*Primary Examiner*—Sinh Tran
*Assistant Examiner*—Wanda M Negron
(74) *Attorney, Agent, or Firm*—Oblon, Spivak, McClelland, Maier & Neustadt, L.L.P.

(57) ABSTRACT

An image processing apparatus includes an image capturing unit for capturing a first image by using an image capturing device, a detection unit for detecting applied vibration and outputting a vibration value representing a magnitude of the vibration, a calculation unit for calculating a first correcting value and a second correcting value from the vibration value, an alteration unit for altering, when a difference between the first and second correcting values is equal to or greater than a predetermined threshold value, a region of the second image so as to reduce a distance between the center of an image obtained by correcting the second image on the basis of the first correcting value and the center of another image obtained by correcting the third image on the basis of the second correcting value, and a correction unit for correcting the second image on the basis of the first correcting value.

7 Claims, 23 Drawing Sheets

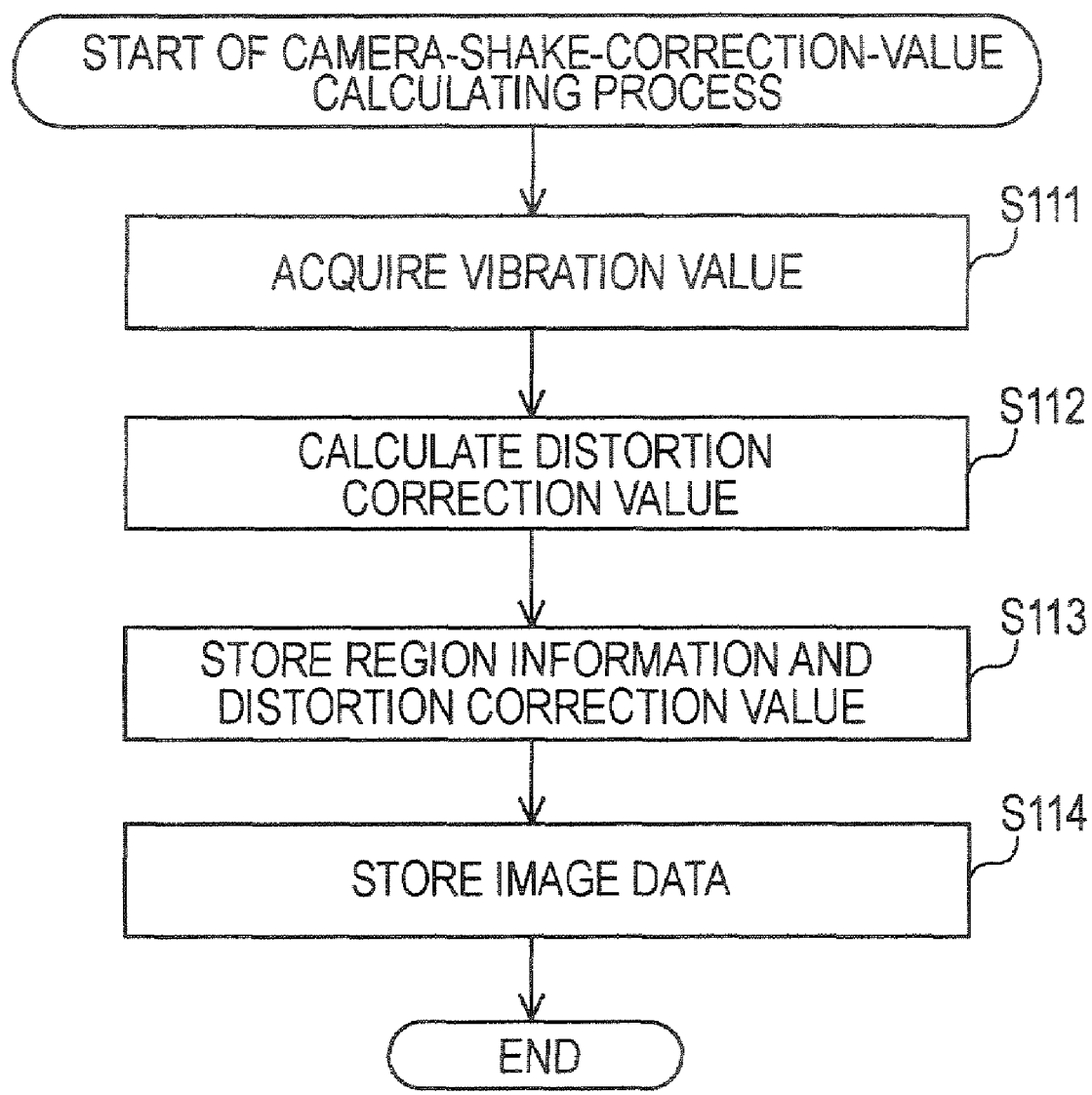

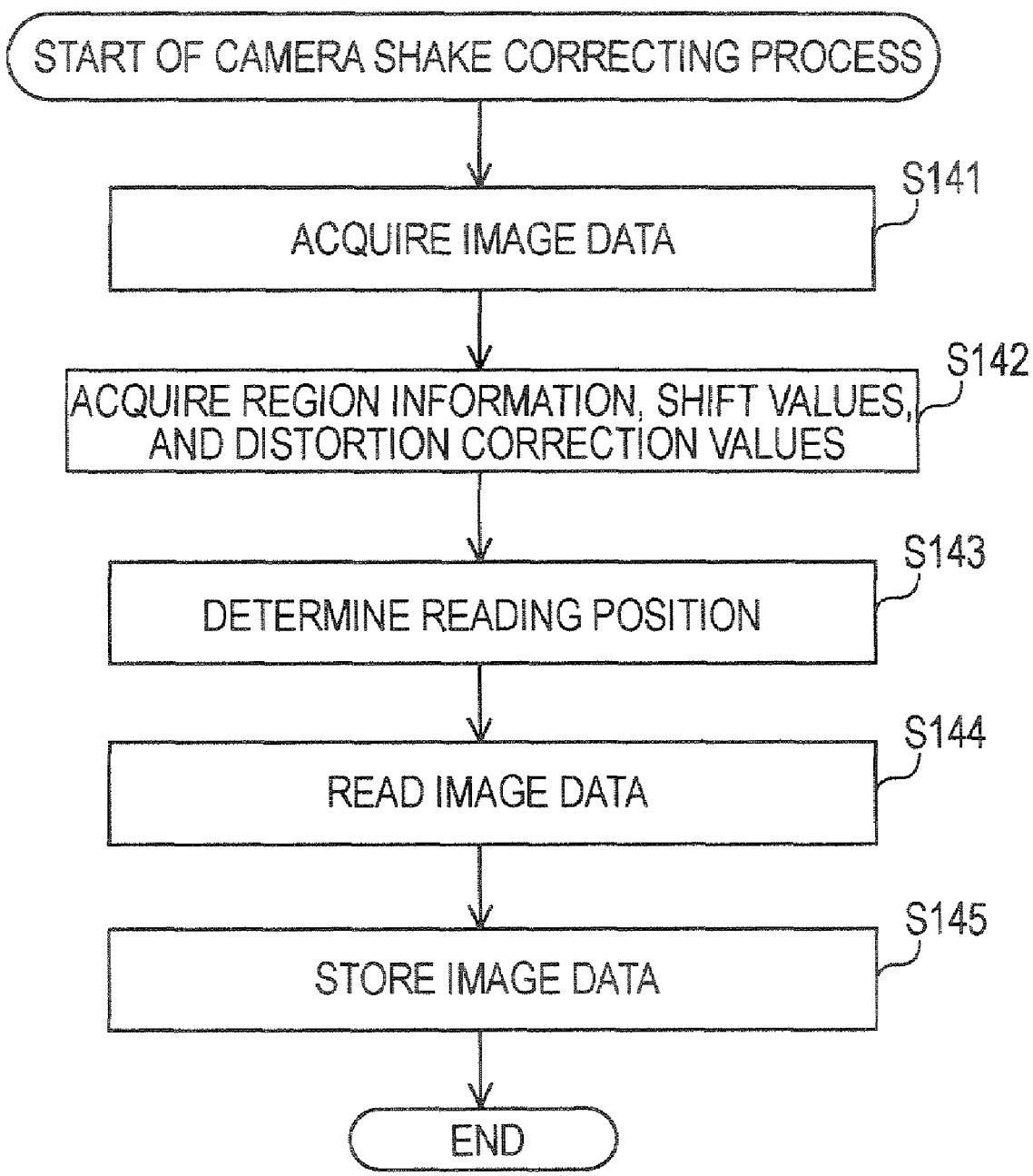

IMAGE PROCESSING APPARATUS AND METHOD, AND PROGRAM USED THEREWITH

CROSS REFERENCES TO RELATED APPLICATIONS

The present invention contains subject matter related to Japanese Patent Application JP 2005-327370 filed in the Japanese Patent Office on Nov. 11, 2005, the entire contents of which are incorporated herein by reference.

BACKGROUND OF THE INVENTION

1. Field of the Invention

The present invention relates to image processing apparatuses and methods, and programs used therewith, and, in particular, an image processing apparatus and method suitable for use in capturing still images during moving image capturing, and a program used therewith.

2. Description of the Related Art

Image capturing apparatuses, such as portable digital camcorders and digital still cameras, have become commonly used. In these image capturing apparatuses, for example, charge-transfer solid-state image sensing devices typified by charge-coupled device (CCD) sensors, and X-Y-address solid-state image sensing devices typified by CMOS (complementary metal-oxide semiconductor) sensors are used as image capturing devices.

The image capturing apparatuses include a type of apparatus having a function (image stabilizing function) in which, when vibration, such as camera shake, is applied to the apparatus during moving image capturing, the function cancels an effect of the vibration. Methods for the function include a method for moving a lens unit for the applied vibration, and a method (see, for example, Japanese Unexamined Patent Application Publication No. 2005-175581) for electronically correcting image instability due to camera shake by shifting (moving), for the applied vibration, in an effective pixel region of an image capturing device, a portion from which data of a still image used as a moving image field is read.

When an image capturing apparatus uses the method for canceling the effect of the vibration by shifting the lens unit, the image capturing apparatus includes an actuator for moving the lens unit and the size of the image capturing apparatus accordingly increases, so that power consumption is also large. Accordingly, it is common that image capturing apparatuses having the function (image stabilizing function) of canceling the effect of the vibration is configured to electronically correct image instability due to camera shake.

In addition, in recent years, there are increasing demands to capture still images during moving image capturing. When a still image is captured simultaneously with moving image capturing, as shown in FIG. 1, in an effective pixel region 11 of an image capturing device, a region 13 (hereinafter referred to as a "still image region") from which (image) data of a still image captured during moving image capturing may be larger than a region 12 (hereinafter referred to as a "moving image region") from which (image) data of a still image used as a moving image field is read.

As shown in FIG. 1, when the moving image region 12 is to some extent smaller than the effective pixel region 11, an excess region for correcting an effect of camera shake can be provided in the effective pixel region 11. In addition, by reducing the number of pixels of a still image used as each field so that the moving image region 12 is to some extent small, the amount of image data of the field can be reduced. Thus, a processing time for moving image capturing can be shortened. Conversely, by setting the still image region 13 to be slightly smaller than the effective pixel region 11, at the time of still image capturing, a still image can be captured with a large angle of view and high resolution.

In the case of electronically correcting a captured moving image, as shown on the left side of FIG. 2, when the position of a subject in the effective pixel region 11 is moved with time by applied vibration from the center to lower right portion of the effective pixel region 11, an image capturing apparatus detects the applied vibration and shifts a moving image region so as to cancel an effect of the detected vibration.

As shown on the left side of FIG. 2, a moving image region 21 at the start of image capturing, that is, of an initial moving image field, is located in the center of the effective pixel region 11. A moving image region 22 of the next field is shifted from the center to lower right portion of the effective pixel region 11, and a moving image region 23 of the next field is further shifted to the lower right portion of the effective pixel region 11. As described above, the moving image regions of the fields are shifted so that the effect of detected vibration is canceled. Thus, as shown in the middle of FIG. 2, image instability due to camera shake is corrected so that, in a still image of each field, the position of a subject is in the center of the still image. As a result, as shown on the right side of FIG. 2, on a display screen on which a moving image is played back and displayed, the position of the subject is in the center of the display screen, so that the subject does not look blurred for a user.

Conversely, in the case of still images, still images of a plurality of fields are not continuously displayed differently from the case of moving images. Thus, an image of the subject displayed on the display screen does not look blurred. Accordingly, when a still image is captured during moving image capturing, it is only necessary for the subject to be within the still image region 13 or to be viewed as a still image. In other words, correction of still image instability due to camera shake produces less advantage. Therefore, it is generally considered that correction of still image instability due to camera shake is less significant.

SUMMARY OF THE INVENTION

In an example of the related art, when an effect of vibration (camera shake) applied to an image capturing apparatus is electronically corrected, as shown in FIG. 3, a captured moving image is corrected concerning image instability due to camera shake, while a still image is not corrected concerning image instability due to camera shake. In FIG. 3, portions corresponding to those shown in FIG. 2 are denoted by identical reference numerals, and their descriptions are omitted, if necessary.

As shown on the left side of FIG. 3, a moving image region 21 at the start of image capturing, that is, of an initial moving image field, is located in the center of an effective pixel region 11. A moving image region 22 of the next field is shifted from the center to lower right portion of the effective pixel region 11, and a moving image region 23 of the next field is further shifted to the lower right portion of the effective pixel region 11. Unlike that, a still image is not corrected concerning image instability due to camera shake, so that a still image region 13 is not shifted.

Therefore, at each of times, the center of the moving image region may not coincide with the center of the still image region 13. As shown in the middle of FIG. 3, subject's positions in the moving image regions 21 to 23 of fields are the centers of the moving image regions 21 to 23, while a subject's position in the still image region 13 differs depending on a time at which the still image is captured.

Since moving image instability due to camera shake is corrected, as shown on the right side of FIG. 3, the position of the subject image displayed on a display screen 31 of the image capturing apparatus at the start of image capturing is in the center of the display screen 31. However, at each of times, a moving image region center may not coincide with a still image region center, so that, as shown on the lower right side of FIG. 3, a subject in the still image is located at a position that is not the center of the still image, such as a lower right portion of the still image.

The user captures a still image (moving image) while confirming an angle of view by viewing the display screen 31, on which a moving image captured with the image capturing apparatus is displayed. Thus, even if the subject looks located in the center of the display screen 31 for the user, in an actually captured still image, the subject may not be in the center of the still image. This is inconvenient for the user.

Accordingly, as shown in the middle of FIG. 4, by also shifting the still image region 13 equally to the amount of shifting the moving image region, at each time, the position of the center of the still image region can coincide with the position of the center of the moving image region. In this manner, the position of the subject in the still image captured at each time can be set to coincide with a subject's position displayed on the display screen 31, the subject's position being viewed when the user performs image capturing.

As shown in the middle of FIG. 4, moving and still image instability due to camera shake is corrected so that the centers of the moving image regions 21 to 23 coincide with the centers of still image regions 41 to 43 corresponding to simultaneously captured still images at times that fields of the moving image regions 21 to 23 are captured.

Therefore, as shown on the right side of FIG. 4, the subject in the still image captured at each time is in the center of the still image similarly to the subject whose image is displayed on the display screen 31 of the image capturing apparatus and which is viewed by the user at image capturing.

However, since, as shown in FIG. 1, the still image region 13 is larger than the moving image region 12 in the effective pixel region 11, when performing correction of image instability due to camera shake by shifting the still image region 13 equally to the amount of shifting the moving image region 12, as shown in FIG. 5, the shifted (corrected) still image region may exceed the effective pixel region 11.

As shown on the left side of FIG. 5, a moving image region 51 of an initial moving image field is located in the center of the effective pixel region 11. A moving image region 52 of the next field is shifted from the center to lower right portion of the effective pixel region 11, and a moving image region 53 of the next field is further shifted to the lower right portion of the effective pixel region 11. As described above, the moving image regions of the fields are shifted so that an effect of detected vibration is canceled.

In addition, similarly to the moving image regions 51 to 53, still image regions are also shifted so that an effect of detected vibration is canceled. As shown on the left side in the middle of FIG. 5, still image regions are shown that are shifted equally to the amount of shifting the moving image regions 51 to 53 for correcting image instability due to camera shake. Specifically, still image regions 61 to 63 are captured at times identical to image capture times of moving images for the moving image regions 51 to 53.

As shown in the middle of FIG. 5, the centers of the still image regions 61 and 62 are identical in position to the centers of the moving image regions 51 and 52. As shown on the right side of FIG. 5, the subject in each of the still image regions 61 and 62 is in the center of the still image region similarly to the subject whose image is displayed on the display screen and which is viewed by the user at image capturing.

However, although, as shown at the bottom in the middle of FIG. 5, the center of the still image region 63 is identical in position to the center of the moving image region 53, and the moving image region 53 is within the effective pixel region 11, the still image region 63 exceeds the effective pixel region 11. At the bottom in the middle of FIG. 5, a hatched portion of the still image region 63 indicates a portion exceeding the effective pixel region 11.

As described above, the portion of the still image region 63 that exceeds the effective pixel region 11 has no image data, so that it is difficult to read image data from the exceeding portion. Thus, the exceeding portion appears black in the still image, and the exceeding portion causes an image in which an end portion of the effective pixel region 11 in the still image region 63 is extended. In other words, the exceeding portion causes an unnatural still image.

The present invention has been made in view of the above circumstances. It is desirable, when a still image is captured during moving image capturing, to set the position of a subject in the still image to be closer to a subject's position confirmed by a user on a display screen of an image capturing apparatus, and it is also desirable to process a captured still image into a comfortable and natural image.

According to an embodiment of the present invention, there is provided an image processing apparatus including image capturing means for capturing a first image by using an image capturing device, detection means for detecting applied vibration and outputting a vibration value representing a magnitude of the vibration, calculation means for calculating a first correcting value and a second correcting value from the vibration value, the first correcting value representing a displacement for moving, in the first image, a position of a second image selectively output from the first image so that an effect of the vibration on the second image is suppressed, the second correcting value representing a displacement for moving, in the first image, a third image selectively output from the first image so that an effect of the vibration on the third image is suppressed, alteration means for altering, when a difference between the first correcting value and the second correcting value is equal to or greater than a predetermined threshold value, a region corresponding to the second image so as to reduce a distance between the center of a corrected second image and the center of a corrected third image, the corrected second image being obtained by correcting the second image on the basis of the first correcting value, the corrected third image being obtained by correcting the third image on the basis of the second correcting value, and correction means for correcting the second image on the basis of the first correcting value.

When the calculated first correcting value is greater than a predetermined value, the calculation means may use the predetermined value as the first correcting value.

The calculation means also may calculate distortion correction values on the basis of the vibration value and the first correcting value so that an effect of distortion caused by the vibration in the second image is suppressed, the distortion correction values each representing a displacement for moving a position of each of lines of pixels included in the second image, and the correction means may correct the second image on the basis of the first correcting value and the distortion correction values.

When one distortion correction value for a predetermined line of pixels included in the second image is greater than a predetermined value based on the first correcting value, the calculation means may use, as the distortion correction value for the predetermined line, the predetermined value based on the first correcting value.

According to another embodiment of the present invention, there is provided an image processing method or program including the steps of capturing a first image by using an image capturing device, detecting applied vibration and outputting a vibration value representing a magnitude of the vibration, calculating a first correcting value and a second correcting value from the vibration value, the first correcting value representing a displacement for moving, in the first image, a position of a second image selectively output from the first image so that an effect of the vibration on the second image is suppressed, the second correcting value representing a displacement for moving, in the first image, a third image selectively output from the first image so that an effect of the vibration on the third image is suppressed, altering, when a difference between the first correcting value and the second correcting value is equal to or greater than a predetermined threshold value, a region corresponding to the second image so as to reduce a distance between the center of a corrected second image and the center of a corrected third image, the corrected second image being obtained by correcting the second image on the basis of the first correcting value, the corrected third image being obtained by correcting the third image on the basis of the second correcting value, and correcting the second image on the basis of the first correcting value.

In an embodiment of the present invention, a first image is captured by using an image capturing device, applied vibration is detected, and a vibration value representing a magnitude of the vibration is output. From the vibration value, a first correcting value and a second correcting value are calculated, the first correcting value representing a displacement for moving, in the first image, a position of a second image selectively output from the first image so that an effect of the vibration on the second image is suppressed, the second correcting value representing a displacement for moving, in the first image, a third image selectively output from the first image so that an effect of the vibration on the third image is suppressed. When a difference between the first correcting value and the second correcting value is equal to or greater than a predetermined threshold value, a region corresponding to the second image is altered so as to reduce a distance between the center of a corrected second image and the center of a corrected third image, the corrected second image being obtained by correcting the second image on the basis of the first correcting value, the corrected third image being obtained by correcting the third image on the basis of the second correcting value. On the basis of the first correcting value, the second image is corrected.

As described above, according to an embodiment of the present invention, still images can be captured. In particular, according to an embodiment of the present invention, when a still image is captured during moving image capturing, the position of a subject in the still image can be made closer to a subject's position confirmed by a user on a display screen of the image capturing device, and the captured still image can be made natural.

BRIEF DESCRIPTION OF THE DRAWINGS

FIG. 21 is a flowchart illustrating a camera-shake-correction-value calculating process;

FIG. 22 is a flowchart illustrating a camera shake correcting process; and

DESCRIPTION OF THE PREFERRED EMBODIMENTS

Figure 1:
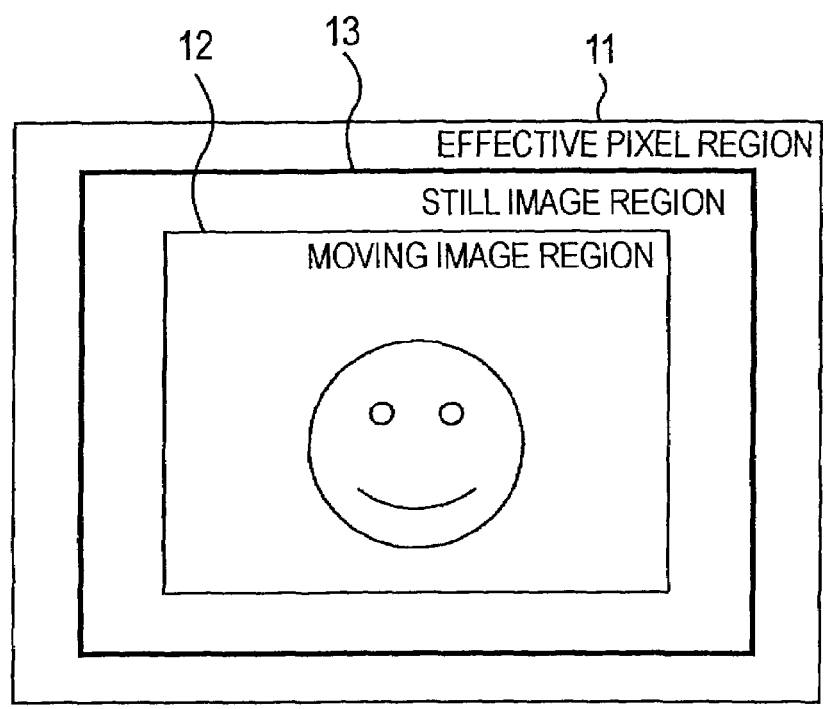
FIG. 1 is an illustration of a relationship between a moving image region and a still image region in an effective pixel region in an example of the related art.
Figure 2:
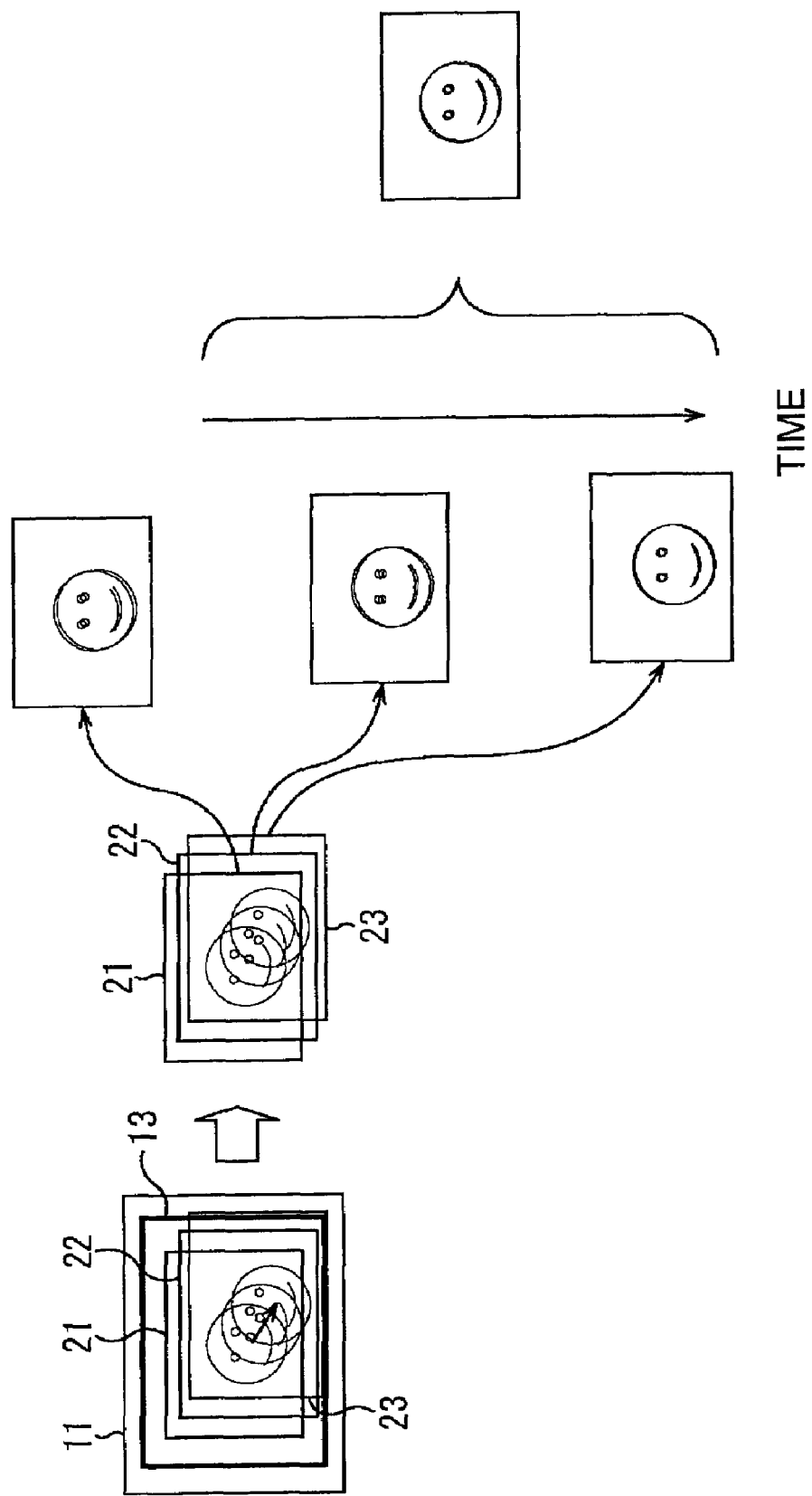
FIG. 2 is an illustration of camera shake correction of the related art in a moving image.
Figure 3:
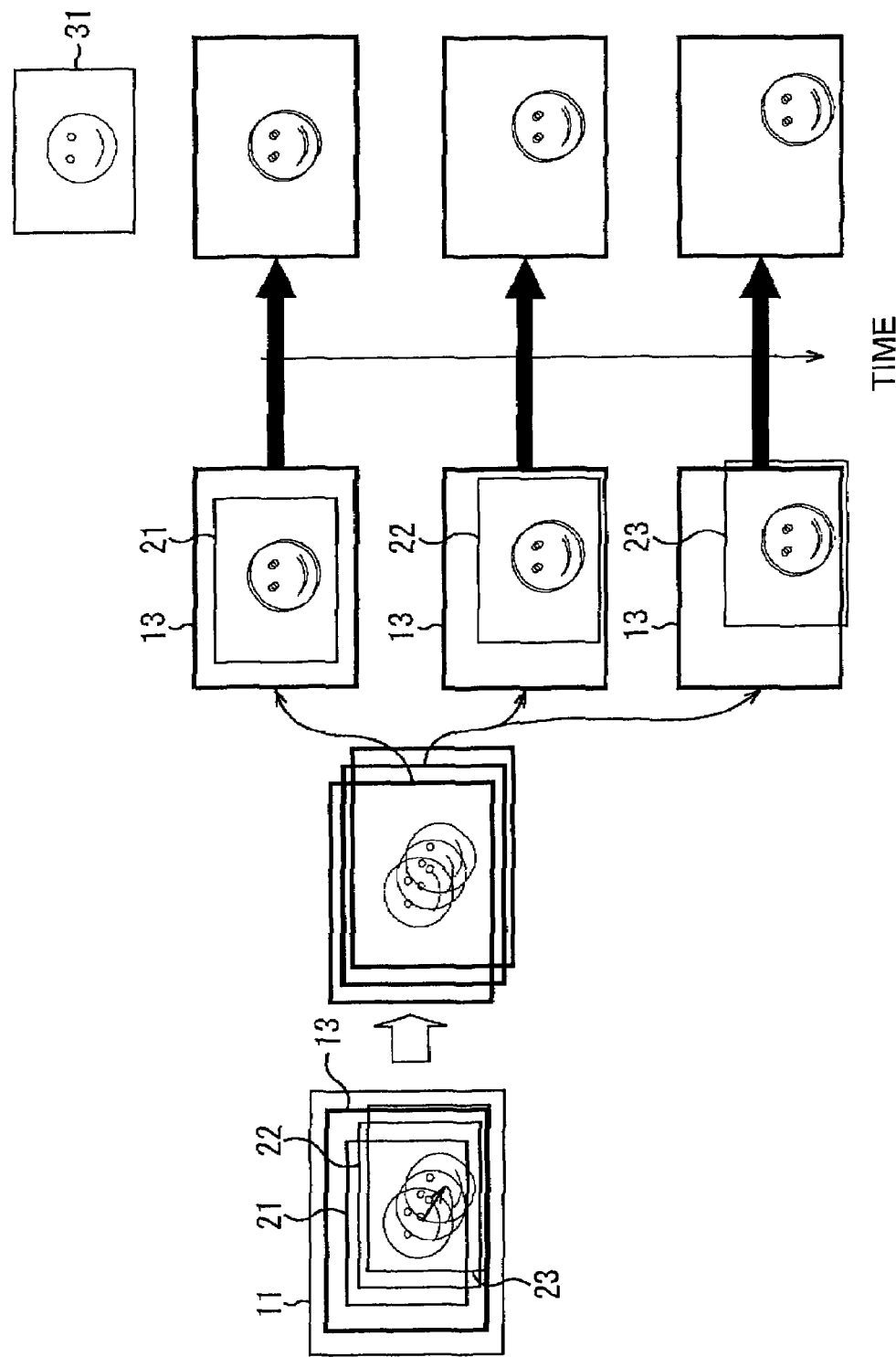
FIG. 3 is an illustration of still image capturing of the related art.
Figure 4:
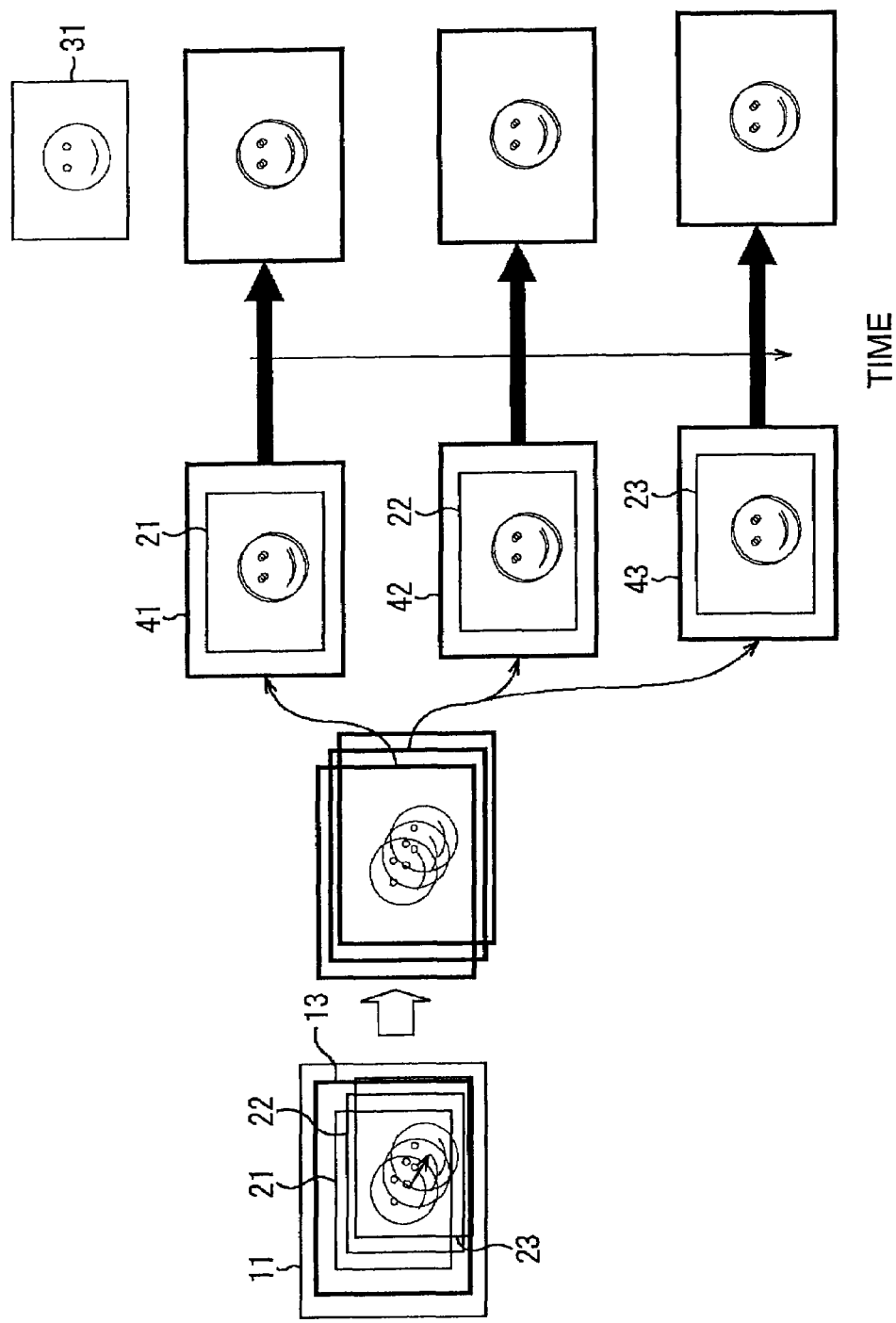
FIG. 4 is an illustration of camera shake correction of the related art in a still image.
Figure 5:
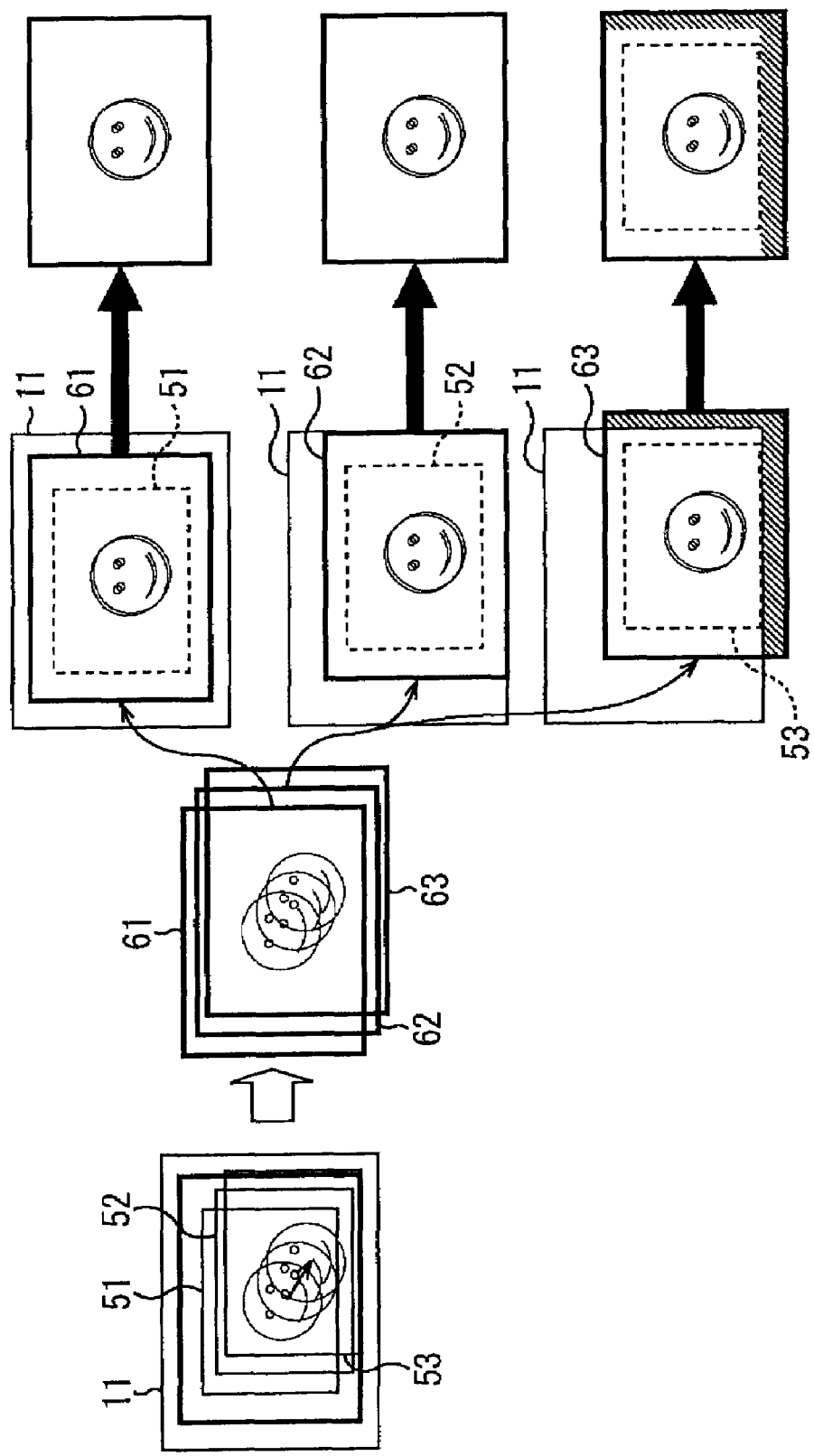
FIG. 5 is an illustration of camera shake correction of the related art in a still image.

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

In this specification, the term "value" or "amount" is equal to a quantity in meaning.

An image processing apparatus according to an embodiment of the present invention includes image capturing means (e.g., the image capturing device 111 shown in FIG. 6) for capturing a first image by using an image capturing device, detection means (e.g., the vibration detection unit 118 shown in FIG. 6) for detecting applied vibration and outputting a vibration value representing a magnitude of the vibration, calculation means (e.g., the correction value calculation unit 119 shown in FIG. 6) for calculating a first correcting value and a second correcting value from the vibration value, the first correcting value representing a displacement for moving, in the first image, a position of a second image selectively output from the first image so that an effect of the vibration on the second image is suppressed, the second correcting value representing a displacement for moving, in the first image, a third image selectively output from the first image so that an effect of the vibration on the third image is suppressed, alteration means (e.g., the region modification section 131 shown in FIG. 6) for altering, when a difference between the first correcting value and the second correcting value is equal to or greater than a predetermined threshold value, a region corresponding to the second image so as to reduce a distance between the center of a corrected second image and the center of a corrected third image, the corrected second image being obtained by correcting the second image on the basis of the first correcting value, the corrected third image being obtained by correcting the third image on the basis of the second correcting value, and correction means (e.g., the image interpolation unit 114 shown in FIG. 6) for correcting the second image on the basis of the first correcting value.

Figure 17:
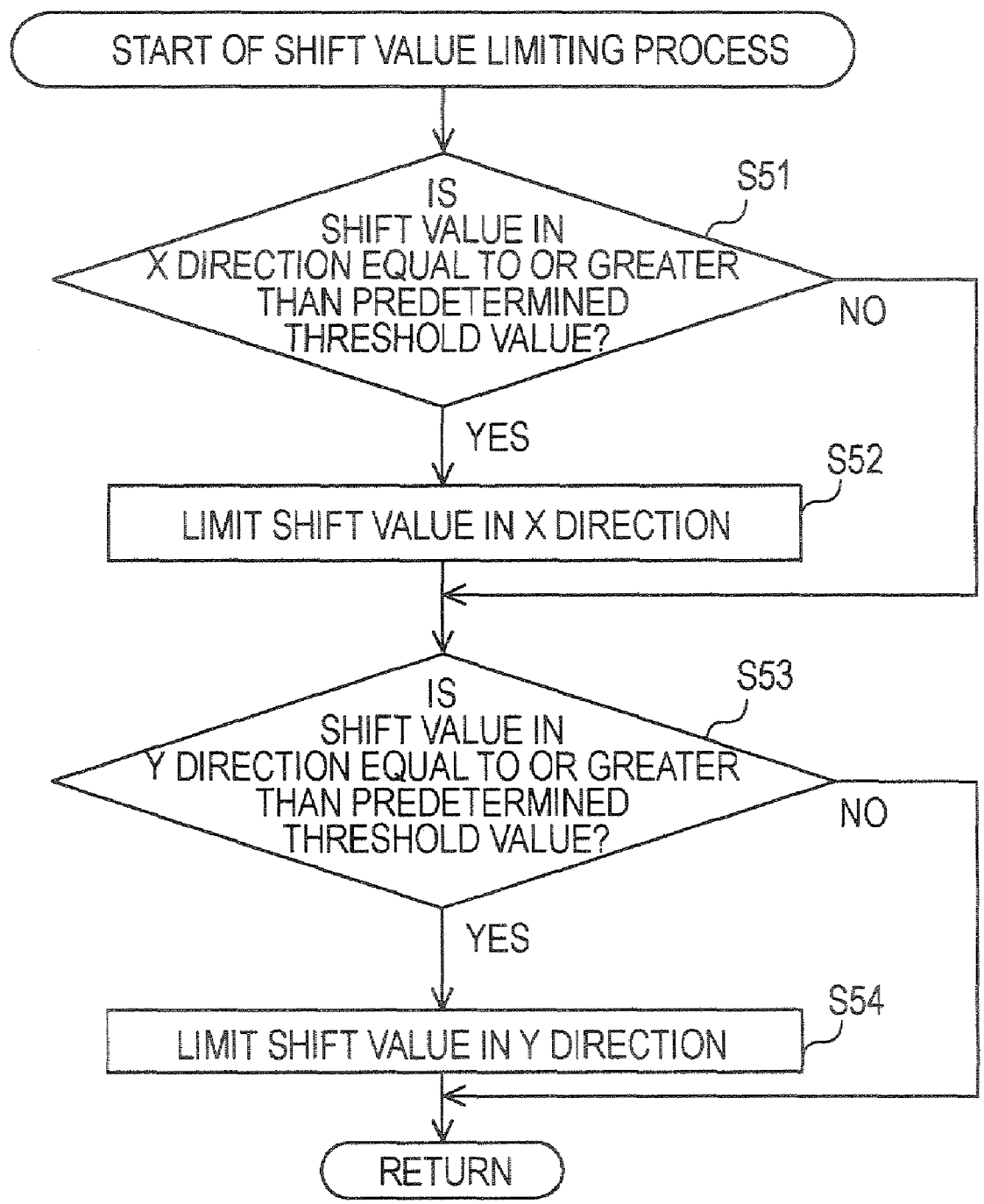
FIG. 17 is a flowchart illustrating a shift value limiting process.

When the calculated first correcting value is greater than a predetermined value, the calculation means (e.g., the correction value calculation unit 119, which executes steps S51 to S54 shown in FIG. 17) may use the predetermined value as the first correcting value.

Figure 13:
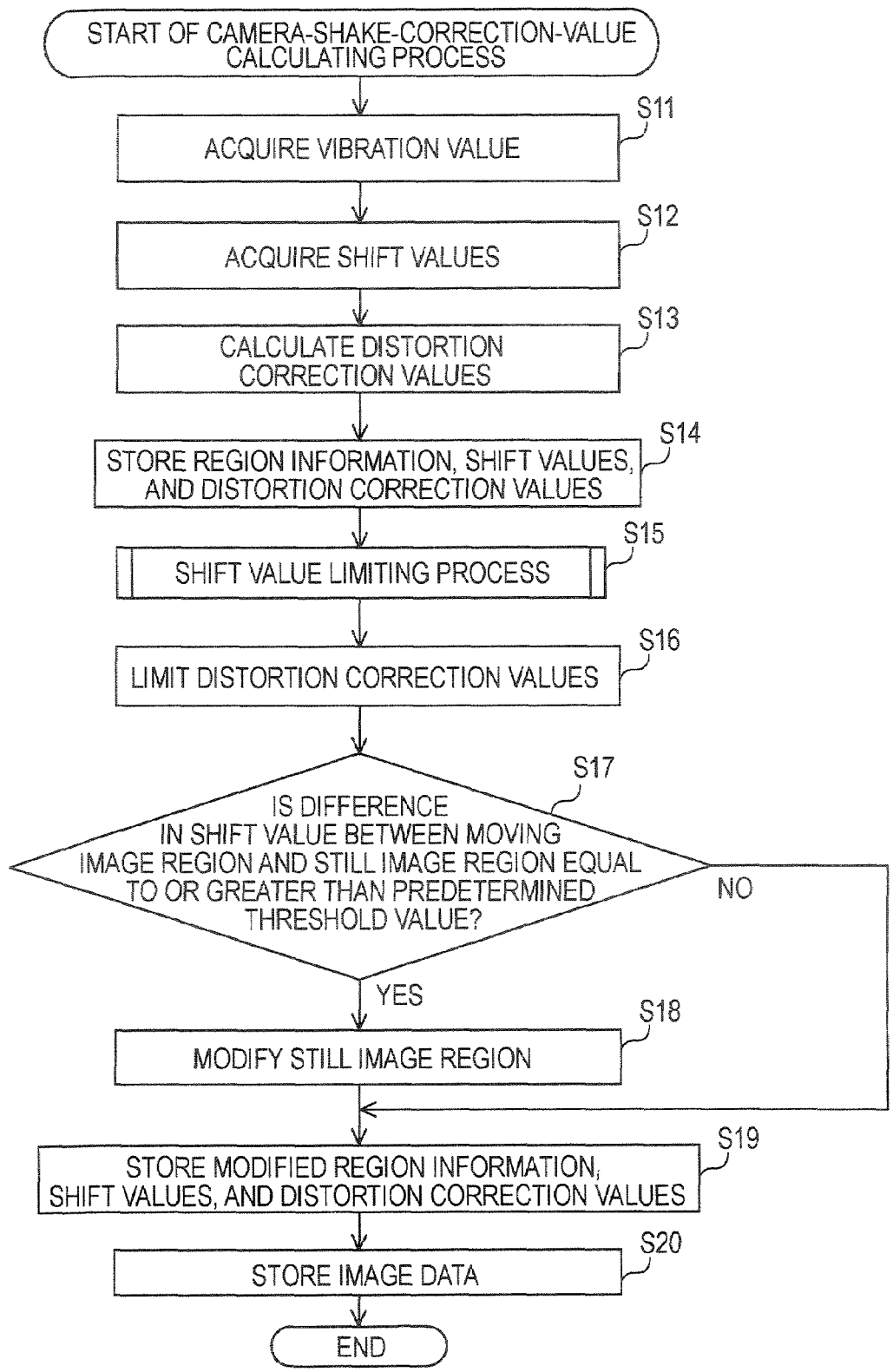
FIG. 13 is a flowchart illustrating a camera-shake-correction-value calculating process.
Figure 18:
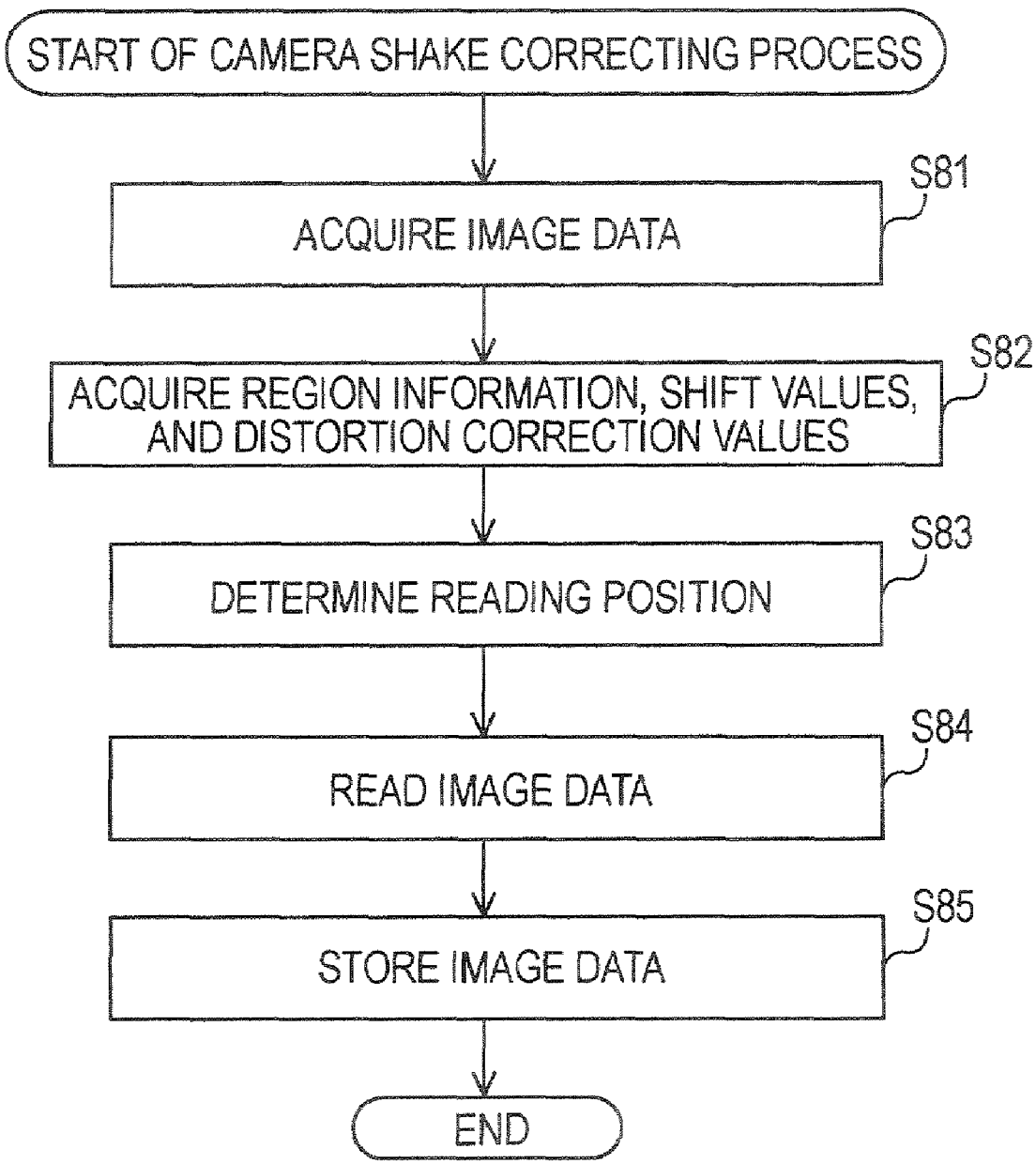
FIG. 18 is a flowchart illustrating a camera-shake correcting process.

The calculation means (the correction value calculation unit 119, which executes step 13 shown in FIG. 13) may also calculate distortion correction values on the basis of the vibration value and the first correcting value so that an effect of distortion caused by the vibration in the second image is suppressed, the distortion correction values each representing a displacement for moving a position of each of lines of pixels included in the second image, and the correction means (e.g., the image interpolation unit 114, which executes step S83 in FIG. 18) may correct the second image on the basis of the first correcting value and the distortion correction values.

When one distortion correction value for a predetermined line of pixels included in the second image is greater than a predetermined value based on the first correcting value, the calculation means (e.g., the correction value calculation unit 119, which executes step S16 shown in FIG. 13) may use, as the distortion correction value for the predetermined line, the predetermined value based on the first correcting value.

An image processing method or program according to an embodiment of the present invention includes the steps of capturing (for example, in step S20 shown in FIG. 13) a first image by using an image capturing device, detecting (for example, in step S11 shown in FIG. 13) applied vibration and outputting a vibration value representing a magnitude of the vibration, calculating (for example, in step S12 shown in FIG. 13) a first correcting value and a second correcting value from the vibration value, the first correcting value representing a displacement for moving, in the first image, a position of a second image selectively output from the first image so that an effect of the vibration on the second image is suppressed, the second correcting value representing a displacement for moving, in the first image, a third image selectively output from the first image so that an effect of the vibration on the third image is suppressed, altering (for example, in step S18 shown in FIG. 13), when a difference between the first correcting value and the second correcting value is equal to or greater than a predetermined threshold value, a region corresponding to the second image so as to reduce a distance between the center of a corrected second image and the center of a corrected third image, the corrected second image being obtained by correcting the second image on the basis of the first correcting value, the corrected third image being obtained by correcting the third image on the basis of the second correcting value, and correcting (for example, in step S83 in FIG. 18) the second image on the basis of the first correcting value.

An embodiment of the present invention is described below with reference to the accompanying drawings.

Figure 6:
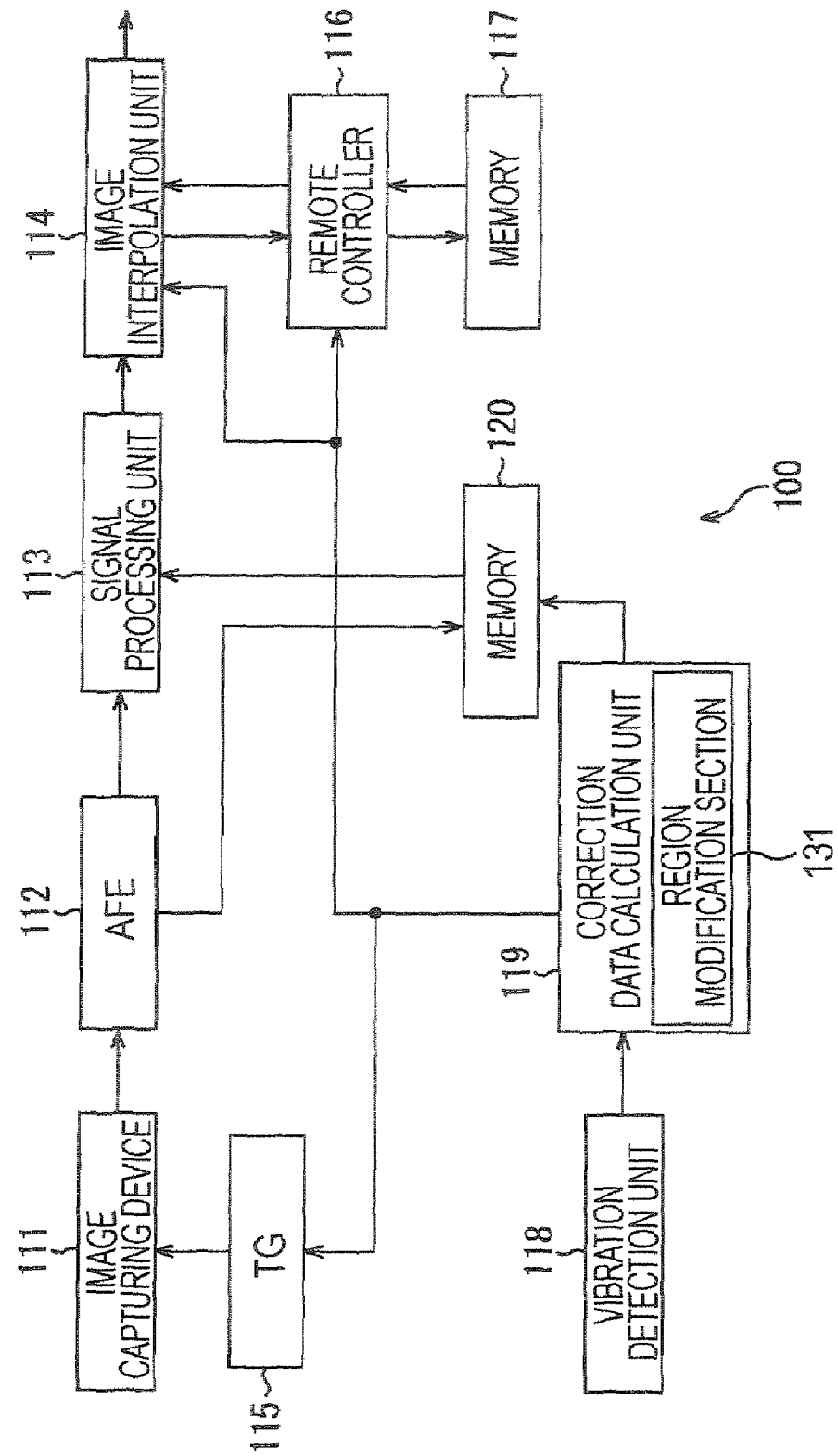
FIG. 6 is a block diagram showing an example of the configuration of an image processing apparatus to which an embodiment of the present invention is applied.

FIG. 6 is a block diagram showing an example of the configuration of an image processing apparatus 100 to which an embodiment of the present invention is applied.

The image processing apparatus 100 includes an image capturing device 111, an analog front end (AFE) 112, a signal processing unit 113, an image interpolation unit 114, a timing generator (TG) 115, a remote controller 116, a memory 117, a vibration detection unit 118, a correction value calculation unit 119, and a memory 120.

The image capturing device 111 is formed by, for example, a charge-transfer solid-state image sensing device (such as a CCD sensor) or an X-Y-address solid-state image sensing device (such as a CMOS sensor). Data (still image data or data of a still image used as a moving image field) of a subject's image captured by the image capturing device 111 is supplied to the AFE 112.

The AFE 112 converts the supplied image data into image data in digital signal form, and supplies the digital signal to the signal processing unit 113 or the memory 120. The signal processing unit 113 calculates a luminance signal and a color-difference signal from image data supplied from the AFE 112 or the memory 120, and supplies the calculated signals to the image interpolation unit 114.

Although the image data supplied to the image interpolation unit 114 is data of the subject's image captured by the image capturing device 111, data of all images captured by the image capturing device 111 is not supplied to the image interpolation unit 114. Only image data that is read with timing from the TG 115 is supplied to the image interpolation unit 114.

The data supplied to the image interpolation unit 114 is temporarily supplied to the memory 117 under the control of the remote controller 116. Conversely, data stored in the memory 117 is read in accordance with an instruction from the remote controller 116, and is supplied to the image interpolation unit 114. After performing image-instability correcting processing, etc., on the supplied image data, the image interpolation unit 114 outputs to record the processed data onto a recording medium (not shown), and outputs to display a still or moving image on a display or the like (not shown).

Here, as vibration applied to the image processing apparatus 100, camera shake by the user is exemplified. However, an embodiment of the present invention is applicable if the vibration is a type of vibration other than camera shake.

The image interpolation unit 114, the TG 115, and the remote controller 116 perform control based on a camera shake correction value calculated by the correction value calculation unit 119 in response to the amount of vibration detected by the vibration detection unit 118.

The vibration detection unit 118 uses a detecting method such as a method using a sensor such as an angular velocity sensor, or a sensorless camera shake detecting method using image processing or the like. The vibration detection unit 118 detects the amount of vibration applied to the image processing apparatus 100 during moving image capturing. When the vibration detection unit 118 is formed by, for example, an angular velocity sensor, the angular velocity sensor supplies the correction value calculation unit 119 with data of angular velocities in a pitching direction and a yawing direction.

The correction value calculation unit 119 calculates a camera shake correction value for correcting movement caused by camera shake. For example, by using the data supplied from the vibration detection unit 118, the correction value calculation unit 119 calculates, as a camera shake correction value, the amount of shift (shift value) indicating for how many pixels a still image region or moving image region should be moved in an effective pixel region of the image capturing device 111 in order to suppress an effect of applied camera shake.

The correction value calculation unit 119 includes a region modification section 131. The region modification section 131 in the correction value calculation unit 119 modifies (alters) a still image region in which still image data is read from an effective pixel region, if necessary.

The memory 120 stores the digital signal supplied from the AFE 112. The memory 120 also stores a shift value supplied from the correction value calculation unit 119, region information representing a modified still image region, etc. The memory 120 supplies the stored image data, shift value, and region information, etc., to the image interpolation unit 114 through the signal processing unit 113.

When the image capturing device 111 in the image processing apparatus 100 is formed by an X-Y-address solid-state image sensing device, it is difficult to use a mechanical shutter at the time of capturing a still image during moving image capturing. Accordingly, still image capturing is performed by an exposure method called the "focal-plane shutter method (rolling shutter method)".

In the focal-plane shutter method, exposure is performed in units of lines. Thus, a shift (time difference) occurs in exposure period for each line of pixels included in a still image (still image region). Therefore, when vibration is applied to the image processing apparatus 100 while it is capturing a still image, an effect of the vibration causes a deformation to occur in the captured still image. The line means a line of pixels in which a plurality of pixels included in a still image (still image region) are arranged in a predetermined direction.

Figure 7:
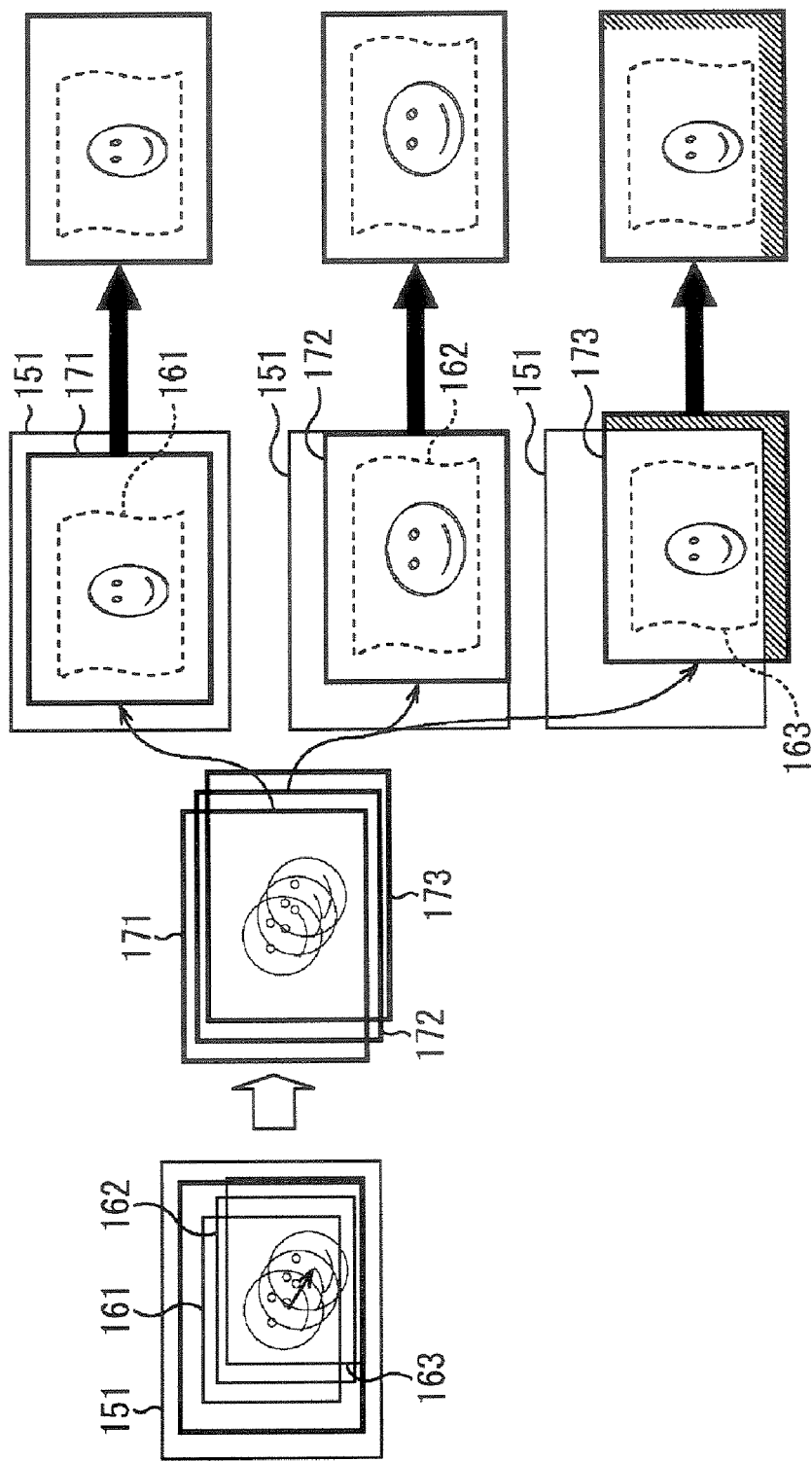
FIG. 7 is an illustration of distortion in subject caused by the focal-plane shutter method.

For example, as shown on the left side of FIG. 7, when a subject's position in an effective pixel region 151 is moved with time by applied vibration from the center to lower right portion of the effective pixel region 151, the applied vibration is detected, and the effective pixel region 151 is shifted so that an effect of the detected vibration is canceled.

As shown on the left side of FIG. 7, a moving image region 161 of an initial moving image field is located in the center of the effective pixel region 151. A moving image region 162 of the next field is shifted from the center to lower right portion of the effective pixel region 151, and a moving image region 163 of the next field is further shifted from the moving image region 162 to the lower right portion of the effective pixel region 151. As described above, the moving image region of each field is shifted so that an effect of the detected vibration is canceled.

Similarly to the moving image regions, a still image region is also shifted so that the effect of the detected vibration is canceled. As shown on the left side of the middle of FIG. 7, a still image region is shown that is shifted equally to the amount of shifting the moving image region in order to correct camera shake. In other words, still image regions 171 to 173 are captured at times identical to image capture times of moving images for the moving image regions 161 to 163.

In addition, as shown in the middle of FIG. 7, the subject in the effective pixel region 151 at each of times looks distorted.

The centers of the still image regions 171 and 172 are identical in position to the centers of the moving image regions 161 and 162.

Although, as shown in the middle of FIG. 7, the center of the still image region 173 is identical in position to the center of the moving image region 163, and the moving image region 163 is within the effective pixel region 151, the still image region 173 exceeds the effective pixel region 151. In FIG. 7, a hatched portion of the still image region 173 indicates an exceeding region that exceeds the effective pixel region 151.

The image processing apparatus 100 limits a shift value of a still image region so that the still image region does not exceed the effective pixel region 151. In order to correct a subject distortion caused by the focal-plane shutter method, the image processing apparatus 100 calculates, as a camera shake correction value, a distortion correction value indicating for how many pixels, in units of each line in the still image region (moving image region), (an image of) the line should be moved to suppress the subject distortion. The image processing apparatus 100 uses the distortion correction value to correct the still image (moving image).

The distortion correction value represents a relative amount of shift in which, in order to suppress a subject distortion, with respect to a center line in the center of the still image region (moving image region), a different line is moved, with the center line used as a reference. Details of the shift value and the correction value are described later.

In the following description, it is assumed that the image capturing device 111 is formed by an X-Y-address solid-state image sensing device, and it is assumed that the image processing apparatus 100 calculates the shift value and the distortion correction value as camera shake correction values for suppressing an effect of camera shake and corrects the still image (moving image). When the image capturing device 111 is formed by a charge-transfer solid-state image sensing device, subject distortion due to camera shake does not occur. Accordingly, only the shift value is calculated as a camera shake correction value, and still image (moving image) correction is performed.

Next, correction of camera shake for a still image captured during moving image capturing is described below with reference to FIGS. 8 to 12.

Figure 8:
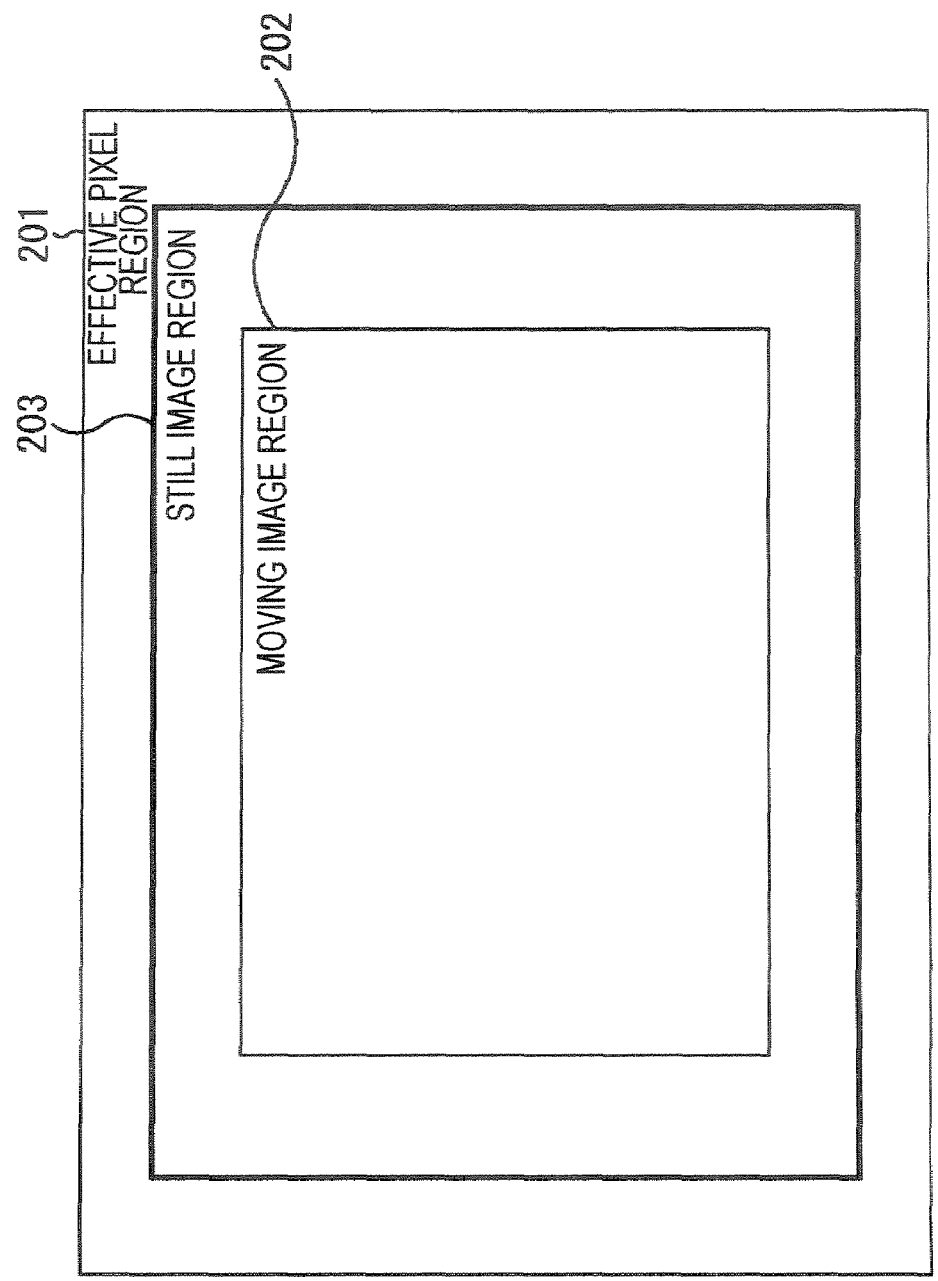
FIG. 8 is an illustration of correction of a still image captured during moving image capturing.

As shown in FIG. 8, for an effective pixel region 201 of the image capturing device 111 in the image processing apparatus 100, a moving image region 202 is, to some extent, smaller than the effective pixel region 201. A still image region 203 is slightly smaller than the effective pixel region 201 and is larger than the moving image region 202. After the image processing apparatus 100 detects the amount (vibration value) of vibration applied to the image processing apparatus 100, the image processing apparatus 100 calculates, on the basis of the detected amount of vibration, a shift value of the still image region 203 and a distortion correction value for each line of the still image region 203, and corrects the camera shake.

As shown in FIG. 8, the still image region 203 is larger than the moving image region 202. Thus, a distance in which the moving image region 202 can be shifted (moved) is greater than a distance in which the still image region 203 can be shifted (moved).

Figure 9:
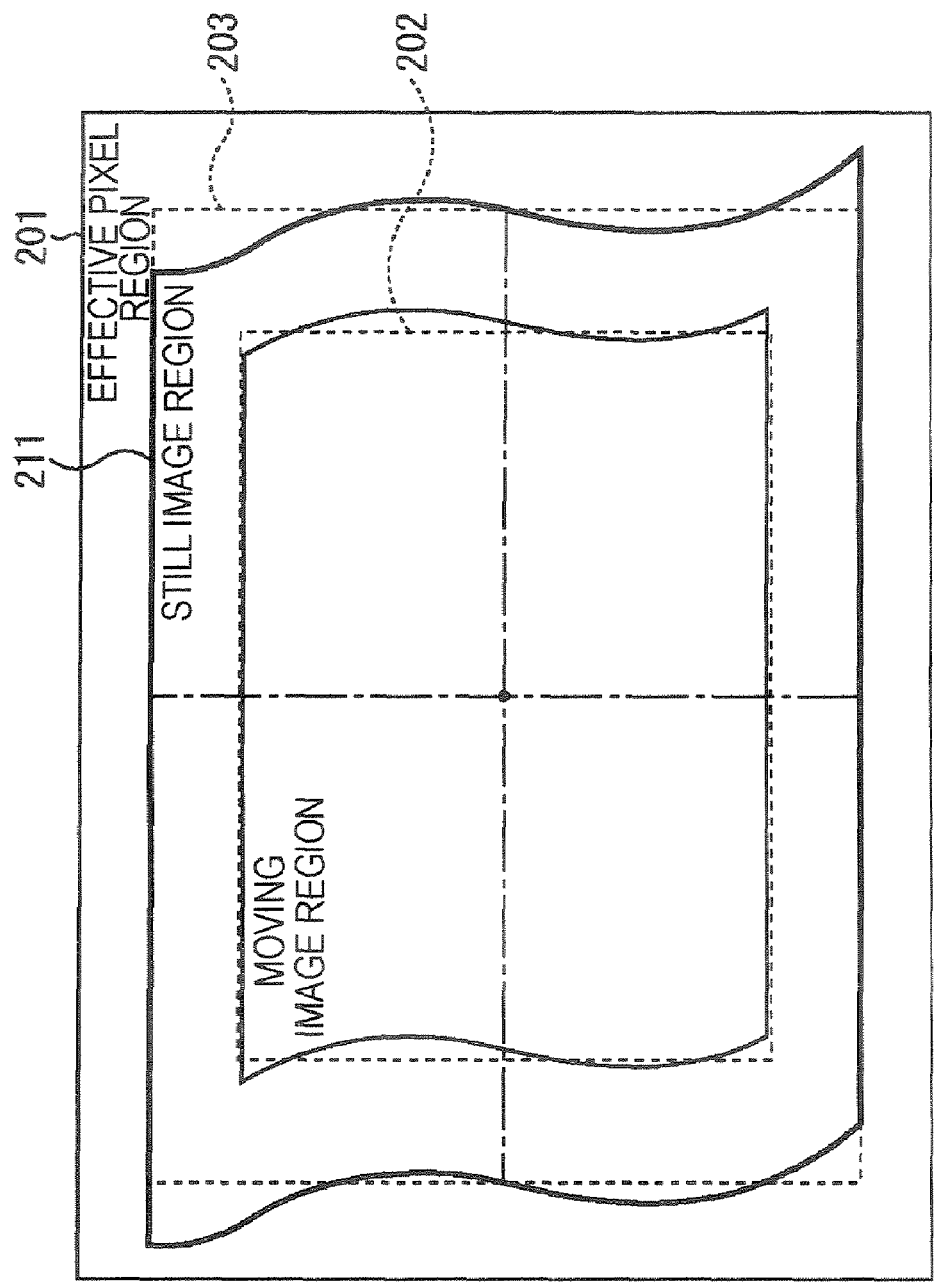
FIG. 9 is an illustration of correction of a still image captured during moving image capturing.

For example, when the calculated shift value is zero, as shown in FIG. 9, the image processing apparatus 100 corrects a still image distortion due to camera shake by shifting each line on the basis of the distortion correction value for the line without shifting the center of the still image region 203. As a result, after being read from a still image region 211 in which lines are shifted on the basis of distortion correction values, image data is used as still image data.

Figure 10:
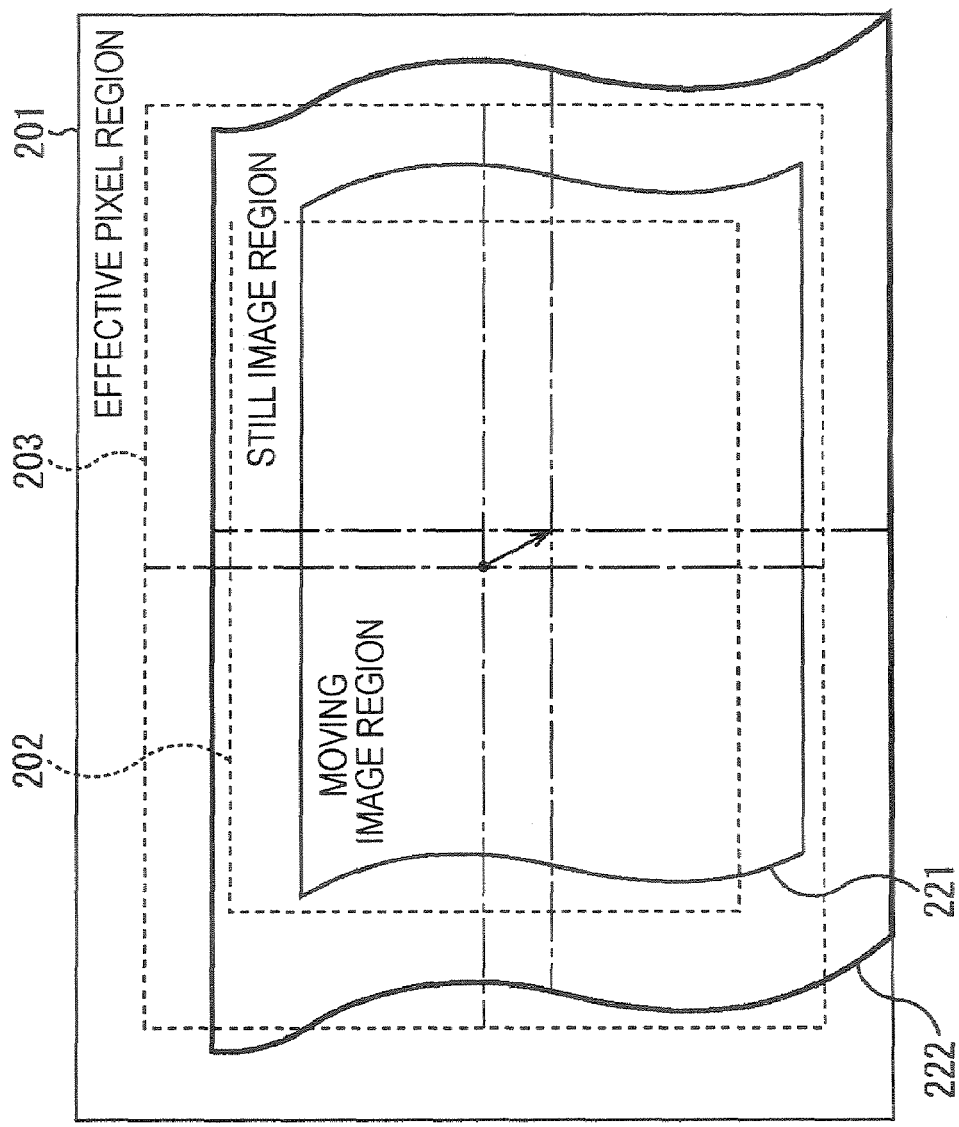
FIG. 10 is an illustration of correction of a still image captured during moving image capturing.

Alternatively, when the calculated shift value is not zero, as shown in FIG. 10, the image processing apparatus 100 shifts (the center of) the still image region 203 by the distance represented by the shift value, and also correct camera shake by shifting each line on the basis of the distortion correction value.

Referring to FIG. 10, the moving image region 202 and the still image region 203, which are indicated by dotted lines, respectively represent a moving image region and a still image region which are in a state before shifting (correction). A moving image region 221 and a still image region 222, which are indicated by solid lines, respectively represent a shifted (corrected) moving image region and a shifted (corrected) still image region. The arrow shown in FIG. 10 indicates a shift value representing the amount of shifting the moving image region 202 and the still image region 203. In the case of FIG. 10, the amount of shifting the moving image region 202 is equal to the amount of shifting the still image region 203.

Figure 11:
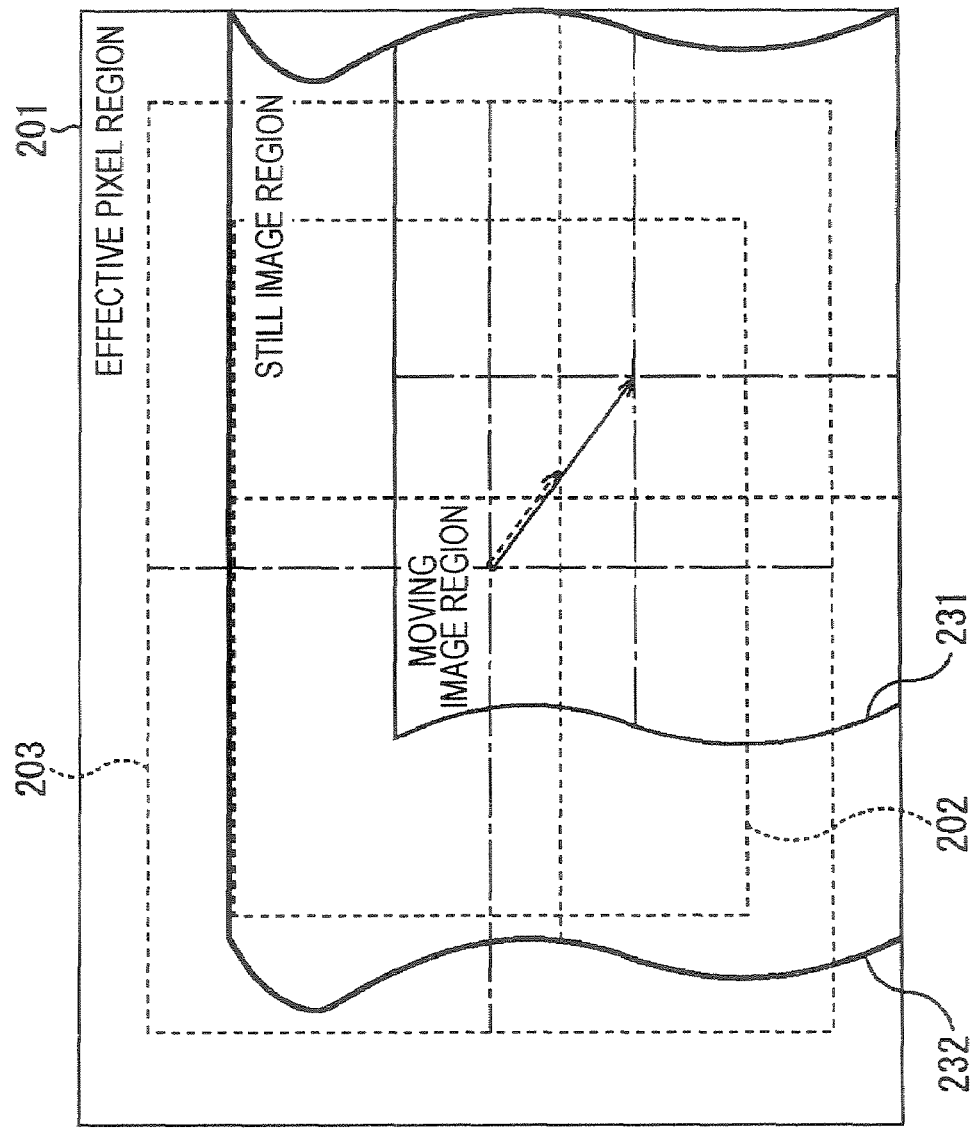
FIG. 11 is an illustration of correction of a still image captured during moving image capturing.

When, by shifting the still image region 203 on the basis of the calculated shift value, the still image region 203 exceeds the effective pixel region 201, as shown in FIG. 11, the image processing apparatus 100 limits the shift value of the still image region 203.

In FIG. 11, the moving image region 202 and the still image region 203, which are indicated by dotted lines, respectively represent a moving image region and a still image region which are in a state before shifting (correction). A moving image region 231 and a still image region 232, indicated by solid lines, respectively represent a shifted (corrected) moving image region and a shifted (corrected) still image region. The solid line arrow shown in the middle of FIG. 11 indicates a shift value representing the amount of shifting the moving image region 202. The dotted line arrow shown in the middle of FIG. 11 indicates a shift value representing the amount of shifting the still image region 203.

In FIG. 11, the still image region 203 is shifted in a lower right direction, and shift values in lower and right directions are limited so that the shifted still image region is located within the effective pixel region 201. Specifically, a shift value of the still image region 203 is limited so that a line at the bottom of the shifted still image region 232 is located to be at a bottom position of the effective pixel region 201 and a rightmost position of the still image region 232 serves as a rightmost position of the effective pixel region 201.

As described above, although the shift value of the moving image region 202 is not limited in the case of FIG. 11, the shift value of the still image region 203 is less than that of the moving image region 202 because the shift value of the still image region 203 is limited.

In addition, when there is a large difference between the shift value of the moving image region 202 and the shift value of the still image region 203, there is a large difference in position between the center of the shifted moving image region 231 and the center of the still image region 232. Thus, the image processing apparatus 100 reduces the still image region so that the center of the shifted still image region 232 is closer in position to the center of the shifted moving image region 231.

Figure 12:
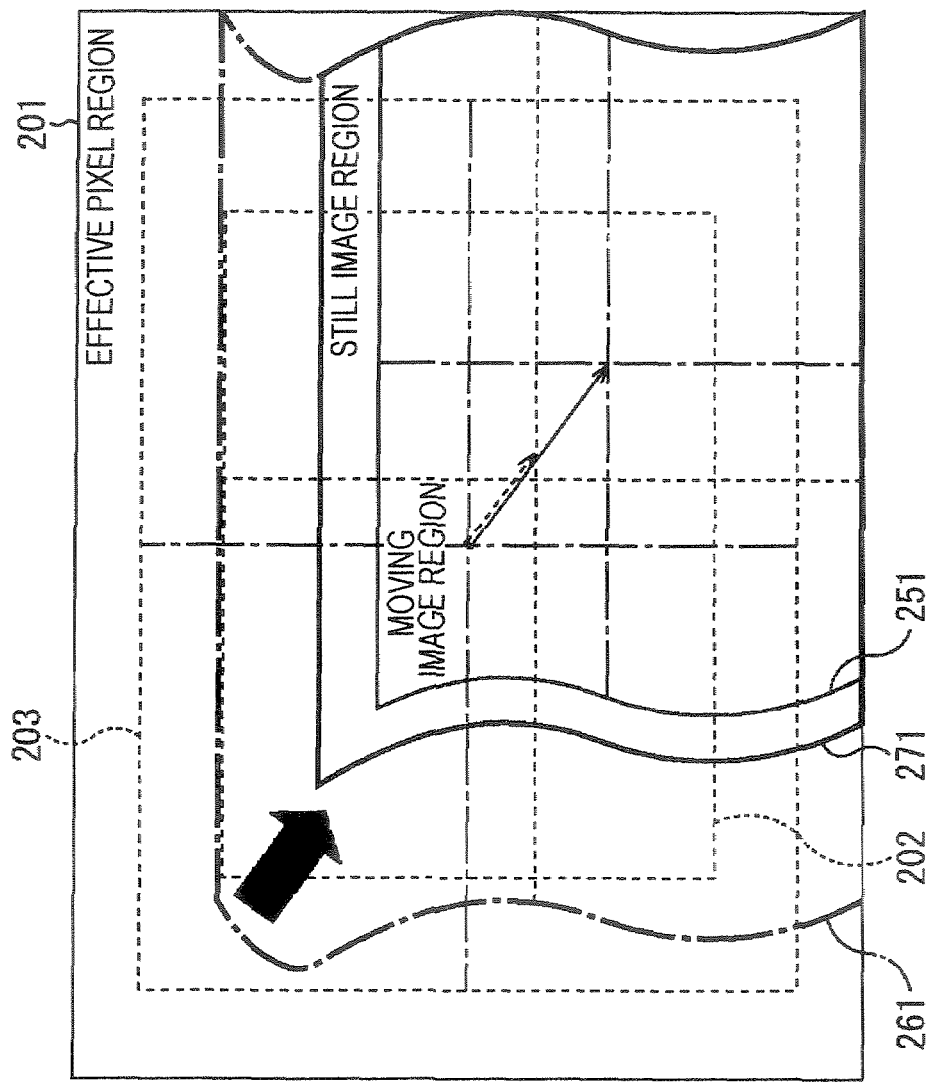
FIG. 12 is an illustration of correction of a still image captured during moving image capturing.

For example, when the difference between the shift values of the still image region 203 and the moving image region 202 is equal to or greater than a predetermined threshold value, as shown in FIG. 12, the image processing apparatus 100 reduces the still image region 203.

Referring to FIG. 12, the moving image region 202 and the still image region 203, which are indicated by dotted lines, respectively represent a moving image region and a still image region which are in a state before shifting (correction), and a moving image region 251 indicated by a solid line represents a shifted (corrected) moving image region. In addition, a still image region 261 indicated by a chain line represents a shifted still image region, and a still image region 271 indicated by a solid line represents a still image region that is reduced in size after being shifted.

The upper left arrow shown in FIG. 12 indicates a direction in which the shifted still image region 261 is reduced. The solid line arrow shown in the middle of FIG. 12 indicates a shift value representing the amount of shifting the moving image region 202, and the dotted line arrow in the middle of FIG. 12 indicates a shift value representing the amount of shifting the still image region 203.

In FIG. 12, the still image region 261 is reduced in size so that, after the still image region 203 is shifted in a lower right direction, the center of the shifted still image region 261 is closer in position to the center of the shifted moving image region 251. Specifically, the shifted still image region 261 is reduced in size so that the top end, shown in FIG. 12, of the still image region 261 is downwardly moved and the left end, shown in FIG. 12, of the still image region 261 is moved in a right direction. At this time, the bottom end and right end, shown in FIG. 12, of the still image region 261 remain unchanged.

As described above, by reducing a still image region so that the center of a shifted still image region is closer in position to the center of a shifted moving image region, the still image region is located within the effective pixel region 201. This makes it possible to set a subject's position in a captured still image to be closer to a subject's position that the user confirms on the display screen.

When the user operates and instructs the image processing apparatus 100 to capture moving images, the image processing apparatus 100 initiates moving image capturing in response to the operation. In other words, the image capturing device 111 captures moving images of the subject, and supplies the resultant image data to the image interpolation unit 114 through the AFE 112 and the signal processing unit 113. The image interpolation unit 114 supplies the image data supplied from the signal processing unit 113 to the memory 117 through the remote controller 116, and the memory 117 stores the supplied image data.

On the basis of the amount of vibration supplied from the vibration detection unit 118, the correction value calculation unit 119 calculates a shift value and distortion correction value for correcting image instability due to camera shake. The correction value calculation unit 119 supplies the calculated shift value and distortion correction value to the memory 117 through the remote controller 116. The image interpolation unit 114 acquires the image data, the shift value, and the distortion correction value from the memory 117, and shifts (moves) the moving image region on the basis of the acquired shift value and distortion correction value. The image interpolation unit 114 reads image data from a moving image region of each moving image field, and supplies and records the read image data on the recording medium (not shown).

As described above, the image processing apparatus 100 captures moving images in response to a user's operation. In addition, by operating and instructing the image processing apparatus 100 by the user to perform still image capturing while the image processing apparatus 100 is performing moving image capturing, the image processing apparatus 100 captures a still image, and performs a camera-shake-correction-value calculating process for calculating a camera shake correction value of a still image. The camera-shake-correction-value calculating process of the image processing apparatus 100 is described below with reference to the flowchart shown in FIG. 13.

In step S11, the correction value calculation unit 119 acquires vibration values (data) detected by the vibration detection unit 118 from the vibration detection unit 118.

Figure 14:
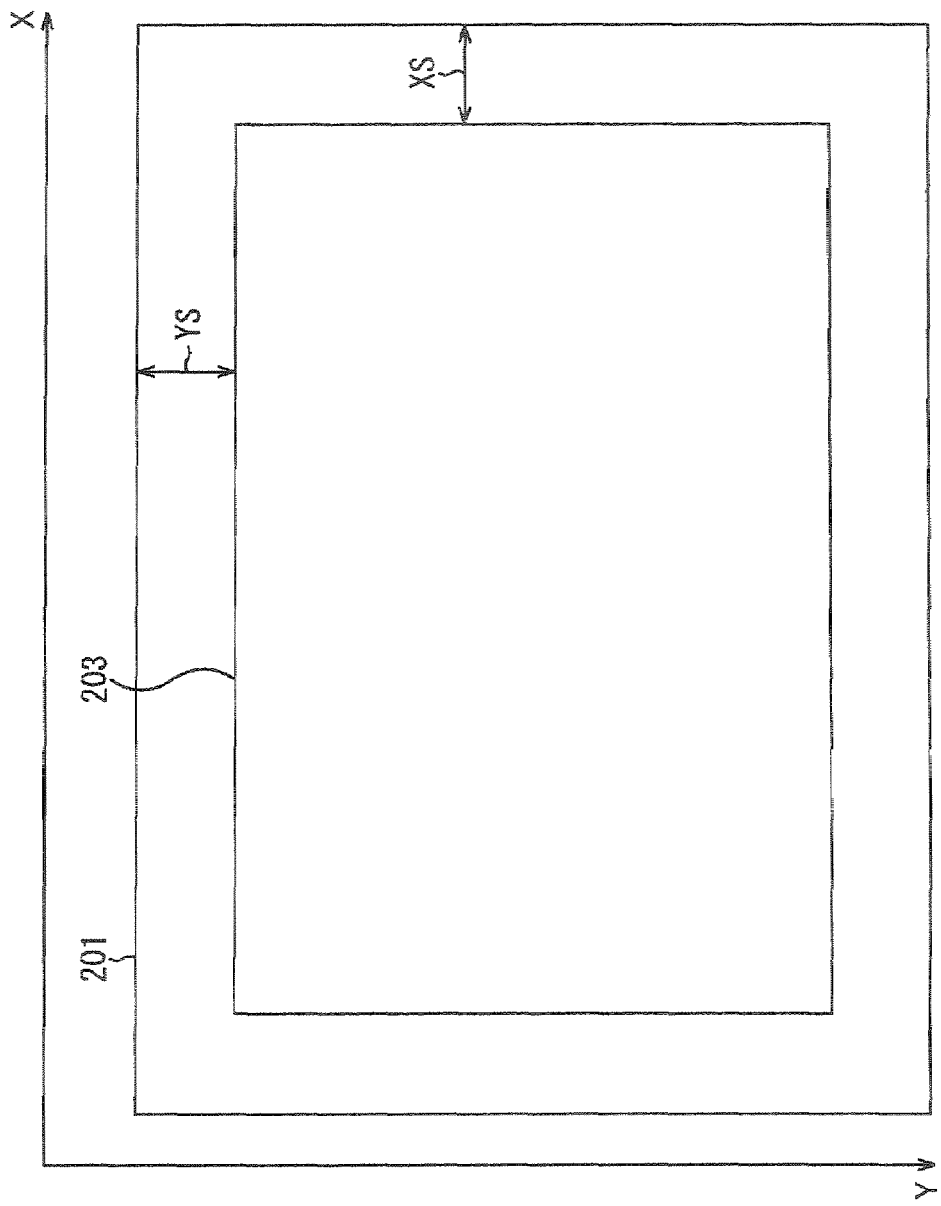
FIG. 14 is an illustration of a still image region.

As shown in, for example, FIG. 14, when a right direction of FIG. 14 is used as an X direction and a downward direction of FIG. 14 is used as a Y direction, the correction value calculation unit 119 acquires vibration values in the X and Y directions. The effective pixel region 201 and still image region 203 shown in FIG. 14 are identical to those shown in FIG. 8. Accordingly, they have identical reference numerals, and their descriptions are omitted.

In FIG. 14, arrow XS represents the distance between a right end of the still image region 203 and a right end of the effective pixel region 201. In other words, arrow XS represents an excess dimension in which the still image region 203 can be shifted (moved) in the X direction. Similarly, arrow YS represents the distance between a top end of the still image region 203 and a top end of the effective pixel region 201. In other words, arrow YS represents an excess dimension in which the still image region 203 can be shifted in the Y direction in the effective pixel region 201. The distances represented by arrows XS and YS are hereinafter referred to simply as "XS" and "YS", respectively.

Figure 15:
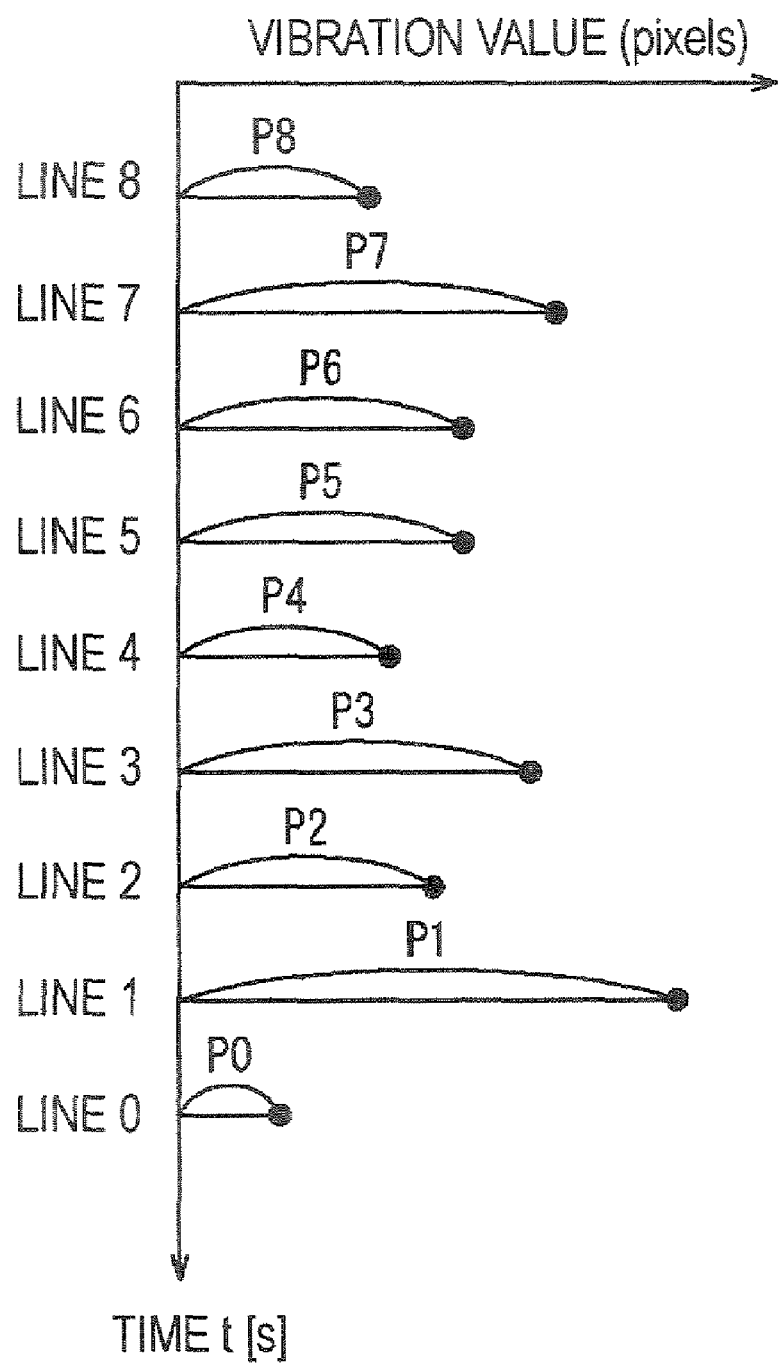
FIG. 15 is an illustration of vibration values detected by a vibration detection unit.

In addition, the vibration detection unit 118 detects, as the vibration value in the X or Y direction, for example, the amount of vibration as shown in FIG. 15, and supplies the detected amount to the correction value calculation unit 119.

In the example shown in FIG. 15, a screen (the still image region 203) includes nine lines, and, on the screen, nine vibration values are acquired every nine lines. Specifically, vibration values P8, P7, P6, P5, P4, P3, P2, P1, and P0 are acquired for lines 8, 7, 6, 5, 4, 3, 2, 1, and 0, respectively.

Although, in this case, for brevity of description, a screen includes nine lines, actually, the screen includes lines, whose number is greater than nine. The vibration values are acquired every nine lines. However, actually, each vibration value may not be acquired in the center of exposure time for each line because there is a shift between a sampling frequency for vibration value acquirement and line reading timing (since the reading time is dependent on exposure time or the like and varies, the time may not match periodic timing such as the sampling frequency.

Accordingly, a vibration value acquired for a predetermined line is used in common to several lines including the predetermined line. Alternatively, by using acquired discrete vibration values to perform interpolation, a vibration value for each line can be generated.

Returning to the description of the flowchart shown in FIG. 13, after the vibration values in the X and Y directions are acquired for each line, in step S12, the correction value calculation unit 119 calculates shift values in the X and Y directions on the basis of the vibration values supplied from the vibration detection unit 118.

For example, the correction value calculation unit 119 calculates the shift values in the X and Y directions on the basis of, among the vibration values supplied from the vibration detection unit 118, vibration values in the X and Y directions for a line in the center of the screen (the still image region 203).

A shift value is a pixel unit value indicating how much a vibration value should be corrected in order to set the vibration value to represent a vibrationless state in which an effect of vibration is suppressed. Shift values of the still image region 203 are calculated on the basis of vibration values detected at exposure of a line in the center of the still image region 203.

For example, assuming that FIG. 15 shows an example of vibration values in the X direction, the line in the center of the screen is line 4. Thus, in order that a state in which the vibration value in the X direction for line 4 is P4 pixels may be changed to a vibrationless state, an absolute value having an opposite sign, in other words, in this case, −P4 pixels, may be calculated as the shift value in the X direction. Similarly to the case of the shift value in the X direction, the correction value calculation unit 119 calculates the shift value in the Y direction on the basis of, among vibration values in the Y direction supplied from the vibration detection unit 118, the vibration value for a line in the center of the screen.

In step S13, on the basis of the vibration values supplied from the vibration detection unit 118, the correction value calculation unit 119 calculates distortion correction values in the X and Y directions for lines. A distortion correction value is a pixel unit value indicating how much each line included in a screen should be shifted for correction with respect to a line in the center of the screen in order to activate a state having no distortion in subject.

For example, assuming that FIG. 15 shows an example in which vibration values in the X direction are shown, the case of calculating a distortion correction value in the X direction for line 8 is discussed. The line in the center of the screen is line 4. Accordingly, in order that a state in which a vibration value in the X direction for line 4 is P4 pixels may be changed into a vibrationless state, line 4 only needs to be shifted by an absolute value having an opposite sign, that is, only −P4 pixels. Similarly, in order that a state in which a vibration value in the X direction for line 8 is P8 pixels may be changed into a vibrationless state, line 8 only needs to be shifted by an absolute value having an opposite sign, that is, only −P8 pixels. Therefore, in order to have a state in which the subject has no distortion in the X direction, line 8 needs to be shifted in the X direction to line 4 by P4−P8 (=(−P8)−(−P4)) (pixels). The correction value calculation unit 119 calculates P4−P8 (pixels) as the distortion correction value in the X direction for line 8.

Also for lines 0 to 7, the correction value calculation unit 119 calculates distortion correction values in the X direction similarly to the case of line 8. The correction value calculation unit 119 also calculates distortion correction values in the Y direction similarly to calculation of the distortion correction values in the X direction. In addition, the correction value calculation unit 119 calculates shift values and distortion correction values for the still image (the still image region 203) by performing steps S11 to S14, and simultaneously calculates shift values and distortion correction values for the moving image (the moving image region 202), as described above.

After calculating the shift values and the distortion correction values, the correction value calculation unit 119 supplies the calculated values to the memory 120. The correction value calculation unit 119 generates and supplies region information representing the (predetermined) still image region 203. The region information can include, for example, in FIG. 14, X-direction and Y-direction dimensions of the still image region 203, and the position, in the effective pixel region 201, of a top left vertex of the still image region 203.

In step S14, the memory 120 stores the region information, shift values, and distortion correction values supplied from the correction value calculation unit 119.

In step S15, the correction value calculation unit 119 performs a shift value limiting process by referring to the shift values stored in the memory 120. Details of the shift value limiting process are described later. In the shift value limiting process, the correction value calculation unit 119 limits the calculated shift values in the X and Y directions so that the shifted still image region does not exceed the effective pixel region 201 (so that the shifted still image region is within the effective pixel region 201). After limiting the shift values, the correction value calculation unit 119 supplies the limited shift values to the memory 120.

More specifically, when the shifted still image region does not exceed the effective pixel region 201, the shift values are not limited in the shift value limiting process. To distinguish between the shift values before being limited in the shift value limiting process and the shift values limited in the shift value limiting process, the shift values limited in the shift value limiting process are hereinafter referred to as the "limited shift value".

In step S16, the correction value calculation unit 119 limits the distortion correction values in the X and Y directions for each line on the basis of the distortion correction values in the X and Y directions which are stored in the memory 120 and the limited shift values in the X and Y directions.

For example, when the correction value calculation unit 119 shifts a predetermined line included in the still image region 203 by the shift value in the X direction limited in step S15, and further shifts the predetermined line by the distortion correction value in the X direction, if the predetermined line is within the effective pixel region 201, the correction value calculation unit 119 directly uses the calculated distortion correction value in the X direction as a distortion correction value in the X direction without limiting the calculated distortion correction value in the X direction.

Conversely, when the correction value calculation unit 119 shifts a predetermined line included in the still image region 203 by the limited shift value in the X direction, and further shifts the predetermined line by the distortion correction value in the X direction, if the predetermined line is not within the effective pixel region 201, that is, if an end of the predetermined line exceeds the effective pixel region 201, the correction value calculation unit 119 limits the distortion correction value in the X direction so that the predetermined line is within the effective pixel region 201.

For example, in a case in which, by shifting a predetermined line included in the still image region 203 in FIG. 14 by the limited shift value in the X direction, and further shifting the predetermined line by the distortion correction value in the X direction, a right end (in FIG. 14) of the predetermined line is more right than a right end of the effective pixel region 201, the correction value calculation unit 119 limits the distortion correction value in the X direction so that, when the predetermined line is shifted by the limited shift value in the X direction and is further shifted by the distortion correction value in the X direction, the right end of the predetermined line is located at the right end of the effective pixel region 201.

For example, when the limited shift value in the X direction of the still image region 203 is represented by PX, a distortion correction value in the X direction for a predetermined line in the still image region 203 is positive. If the distortion correction value is greater than a value represented by XS−PX, the predetermined line exceeds the effective pixel region 201. Accordingly, the distortion correction value in the X direction for the predetermined line is limited such that it is set to XS−PX. Alternatively, when the distortion correction value is negative, and the absolute value of the distortion correction value is greater than a value represented by XS+PX, the line exceeds the effective pixel region 201. Accordingly, the distortion correction value in the X direction for the line is limited such that it is set to −(XS+PX).

Similarly to the case of limiting the distortion correction value in the X direction, the correction value calculation unit 119 also limits the distortion correction value in the Y direction. As described above, the correction value calculation unit 119 limits the distortion correction values in the X and Y directions for all the lines included in the still image region 203. After limiting the distortion correction values, the correction value calculation unit 119 supplies the distortion correction values to the memory 120.

More specifically, when the shifted still image region based on the distortion correction values does not exceed the effective pixel region 201, the distortion correction values are not limited in step S16. To distinguish between the distortion correction values before being limited in step S16 and the distortion correction values limited in step S16, the distortion correction values limited in step S16 are hereinafter referred to as the "limited distortion correction values".

In step S17, the region modification section 131 in the correction value calculation unit 119 determines whether a difference between a shift value of the moving image region 202 and limited shift value of the still image region 203 which are calculated by the correction value calculation unit 119 is greater than a predetermined threshold value.

The region modification section 131 determines whether a difference between a shift value of the moving image region 202 and limited shift value of the still image region 203 is greater than a predetermined threshold value on the basis of the following expression:

$$((MX)^2+(MY)^2)^{1/2}-((PX)^2+(PY)^2)^{1/2} \geqq Th$$

where MX and MY respectively represent shift values in the X and Y directions of the moving image region 202, PX and PY respectively represent limited shift values in the X and Y directions of the still image region 203, and Th represents a predetermined threshold value.

When MX, MY, PX, PY, and Th satisfy the relationship represented by the above expression, the region modification section 131 determines that the difference between the shift value of the moving image region 202 and the shift value of the still image region 203 is greater than the predetermined threshold value.

If, in step S17, it is determined that the difference is greater than the predetermined threshold value, the center of the shifted moving image region greatly differs in position from the center of the still image region, so that the position of the subject in the still image region greatly differs from the position of the subject confirmed by the user on the display screen of the image processing apparatus 100. Accordingly, the region modification section 131 proceeds to step S18 in order to modify the position of the center of the still image region.

In step S18, the region modification section 131 modifies the still image region so that the center of the shifted still image region is closer in position to the center of the shifted moving image region.

Figure 16:
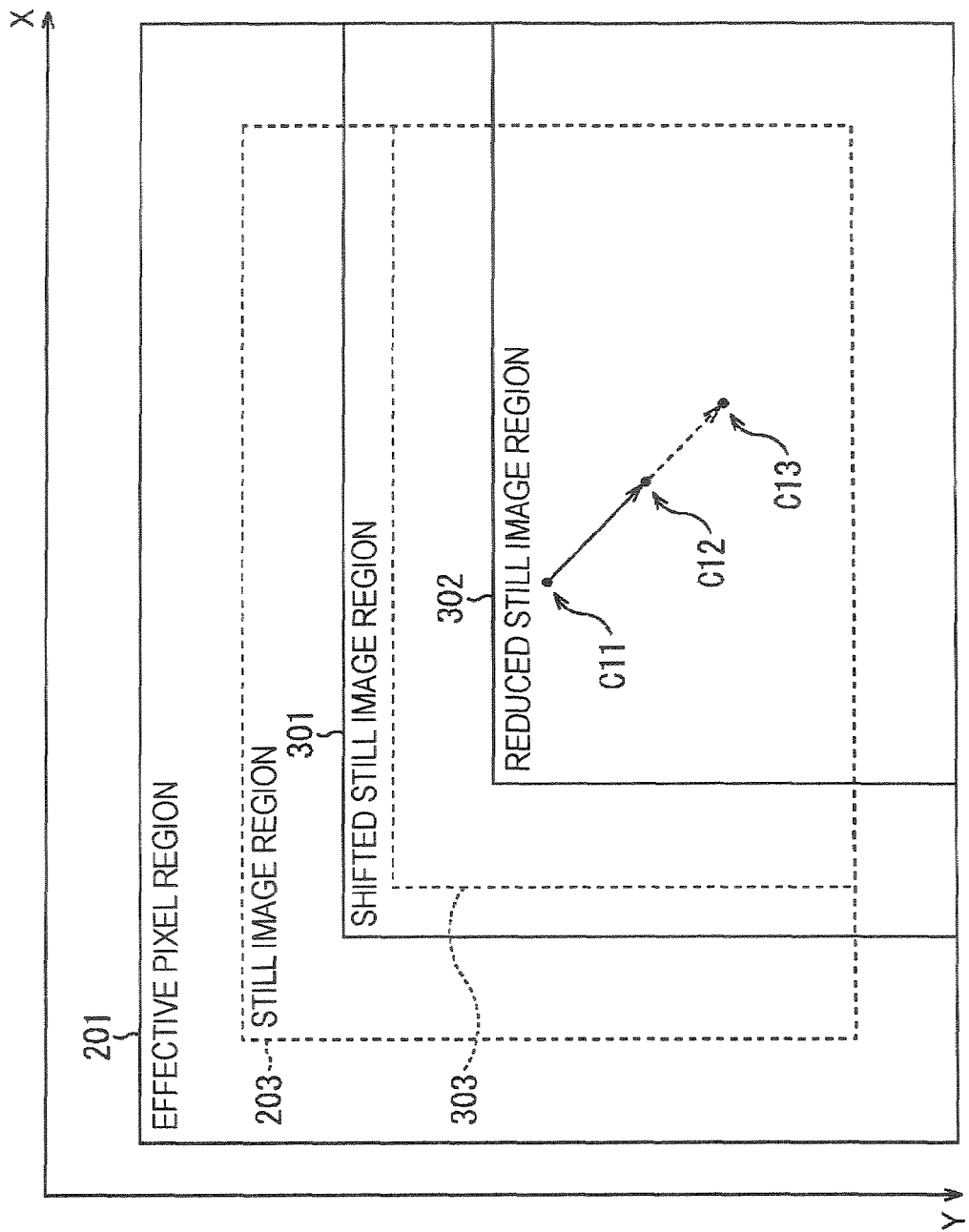
FIG. 16 is an illustration a reduced still image region.

As shown in FIG. 16, the region modification section 131 modifies the still image region, for example, by reducing a shifted still image region.

In FIG. 16, points denoted by arrows C11 to C13 respectively indicate center points (hereinafter referred to also as "points C11 to C13") of the still image region. Portions in FIG. 16 which correspond to those shown in FIG. 14 are denoted by identical reference numerals, and their descriptions are omitted.

Point C11 indicates the center of an unshifted still image region 203 indicated by a dotted line. The solid line arrow, shown in FIG. 16, connecting points C11 and C12, indicates a shift value (direction and distance of shifting) of the still image region 203 which is limited so that the shifted still image region does not exceed the effective pixel region 201. Point C12 indicates the center of a shifted still image region 301 obtained such that the still image region 203 is shifted by limited shift values in the X and Y directions.

When the shift value of the moving image region 202 (FIG. 8) and the limited shift value of the still image region 203 satisfy the relationship represented by the above expression, the region modification section 131 extends the solid line arrow indicating the shift value of the still image region 203 by the distance indicated by the dotted line arrow so that the shift value of the moving image region 202 and the shift value of the still image region 203 do not satisfy the relationship represented by the above expression. After that, the region modification section 131 reduces the shifted still image region 301 to modify the still image region so that point C13, obtained by extension by the distance indicated by the dotted line arrow, serves as the position of the center of the still image region.

In FIG. 16, a reduced still image region 302 is such that a top side (end) of the still image region 301 is downwardly reduced and a left side (end) of the still image region 301 is reduced in the right direction so that point C13 serves as the center of the still image region. In addition, a bottom side (end) and right side (end) of the still image region 301 remain unchanged in position, and are identical in position between an unreduced state (the still image region 301) and a reduced state (the still image region 302).

The still image region 302 in the reduced state is a shifted still image region obtained such that the uncorrected still image region is shifted by the limited shift values (the shift values determined in step S15). Thus, the uncorrected still image region is a still image region 303 indicated by a dotted line. Left, right, top, and bottom lengths of the still image region 303 shown in FIG. 16 are equal to left, right, top, and bottom lengths of the still image region 302. In other words, the still image region 302 is a region in the effective pixel region 201 which is obtained by shifting the still image region 303 by the limited shift value.

Therefore, in the example shown in FIG. 16, the still image region 303 is shifted by the limited shift value to form the still image region 302. In addition, image data of the still image region obtained such that each line of the shifted still image region 302 is shifted by the distortion correction value is read as captured still image data.

After the region modification section 131 modifies the still image region, the region modification section 131 generates information including X and Y dimensions of the still image region 303, and the position in the effective pixel region 201 of a top left vertex of the shown still image region 303, and supplies the generated information as region information of the modified still image region to the memory 120.

As described above, by reducing the still image region and modifying the size (dimensions) of the still image region, as described with reference to FIG. 12, the position, based on the shift value, of the center of a shifted still image region can be made closer to the position of the center of a shifted moving image region. Therefore, the still image based on the image data read from the still image region can be made closer to the image confirmed by the user on the display screen of the image processing apparatus 100.

Returning to the description of the flowchart shown in FIG. 13, if, in step S17, it is determined that the difference is not greater than the predetermined threshold value, the process proceeds to step S19, skipping over step S18.

If, in step S18, the still image region is modified, or, in step S17, it is determined that the difference is not greater than the predetermined threshold value, in step S19, the memory 120 stores the modified region information, shift values, and distortion correction values supplied from the correction value calculation unit 119. More specifically, when the still image region is modified, the region information stored in the memory 120 serves as region information of the modified still image region 303 in FIG. 16, while, when the still image region is not modified, the region information stored in the memory 120 serves as the region information of the still image region 203 in FIG. 16. In addition, the shift values and distortion correction values stored in the memory 120 serve as the limited shift values and distortion correction values.

In step S20, the memory 120 stores the image data supplied from the image capturing device 111 through the AFE 112 before the camera-shake-correction-value calculating process finishes. At this time, the image capturing device 111 supplies the memory 120 with image data read from the entirety of the effective pixel region 201 shown in FIG. 16 after being captured by the image capturing device 111 in response to a user's instruction.

As described above, the image processing apparatus 100 calculates shift values and distortion correction values for suppressing an effect of vibration due to camera shake, and subsequently limit the shift values and the distortion correction values so that a corrected still image region does not exceed the effective pixel region 201. In addition, the image processing apparatus 100 modifies the still image region, if necessary.

As described above, by limiting shift values and distortion correction values, a corrected still image region can be located within the effective pixel region 201, whereby a still image captured during moving image capturing can be made comfortable and natural. In addition, by modifying (the size of) the still image region, if necessary, the center of the shifted moving image region can be made closer in position to the center of the shifted still image region, whereby the position of the subject in the still image captured during moving image capturing can be made closer to the position of the subject confirmed by the user on the display screen of the image processing apparatus 100.

Next, a shift value limiting process corresponding to step S15 in FIG. 13 is described below with reference to the flowchart shown in FIG. 17.

In step S51, by referring to the shift values stored in the memory 120, the correction value calculation unit 119 determines whether (the absolute value of) a shift value in the X direction of the still image region 203 is greater than a predetermined threshold value. For example, if the shift value in the X direction of the still image region 203 in FIG. 14 is greater than excess dimension XS, the correction value calculation unit 119 determines that the shift value in the X direction is greater than the predetermined value.

If, in step S51, it is determined that the shift value in the X direction is greater than the predetermined value, the process proceeds to step S52, and the correction value calculation unit 119 limits the shift value in the X direction.

For example, when (the absolute value of) the shift value in the X direction of the still image region 203 in FIG. 14 is greater than excess dimension XS in the X direction, shifting of the still image region 203 by the shift value in the X direction causes the shifted still image region to exceed the effective pixel region 201. Accordingly, the shift value in the X direction is limited so that the absolute value of the shift value in the X direction is excess dimension XS in the X direction. Thus, when the shift value in the X direction is positive, the shift value is set to XS, while, when the shift value in the X direction is negative, the shift value is set to −XS.

As described above, by limiting the shift value, even if the still image region 203 is shifted in the X direction by the limited shift value XS, the shifted still image region is prevented from exceeding the effective pixel region 201.

If, in step S51, it is determined that the shift value in the X direction is not greater than the predetermined value, even if the still image region 203 is shifted in the X direction by the shift value in the X direction, the shifted still image region is located within the effective pixel region 201, so that the shift value does not need to be limited. Thus, the process proceeds to step S53, skipping over step S52.

If, in step S51, it is determined that the shift value in the X direction is not greater than the predetermined value, or, in step S52, the shift value in the X direction is limited, in step S53, by referring to the shift values stored in the memory 120, the correction value calculation unit 119 determines whether (the absolute value of) the shift value in the X direction of the still image region 203 is greater than a predetermined value. For example, if the shift value in the Y direction of the still image region 203 in FIG. 14 is greater than excess dimension YS in the Y direction, the correction value calculation unit 119 determines that the shift value in the Y direction is greater than the predetermined value.

If, in step S53, it is determined that the shift value in the Y direction is greater than the predetermined value, the process proceeds to step S54, and the correction value calculation unit 119 limits the shift value in the Y direction. The process proceeds to step S16 in FIG. 13.

For example, when the shift value in the Y direction of the still image region 203 in FIG. 14 is greater than excess dimension YS in the Y direction, shifting of the still image region 203 in the Y direction by the shift value in the Y direction causes the shifted still image region to exceed the effective pixel region 201. Accordingly, the shift value in the Y direction is limited so that the absolute value of the shift value in the Y direction is excess dimension YS in the Y direction. By limiting the shift value in the Y direction in the above manner, even if the still image region 203 is shifted in the Y direction by limited shift value YS, the shifted still image region is prevented from exceeding the effective pixel region 201.

If, in step S53, it is determined that the shift value in the Y direction is not greater than the predetermined value, even if the still image region 203 is shifted in the Y direction by the shift value in the Y direction, the shifted still image region is located within the effective pixel region 201, and the shift value does not need to be limited. Thus, the process proceeds to step S16 in FIG. 13, skipping over step S54.

As described above, the correction value calculation unit 119 limits the shift values of the still image region 203. As described above, by shifting the shift values of the still image region 203, the shifted still image region can typically be located within the effective pixel region 201, whereby the still image captured during moving image capturing can be made more natural.

After the shift values, distortion correction values, and region information for correcting image instability due to camera shake are stored in the memory 120, the image interpolation unit 114 performs a camera shake correcting process for reading the stored values and region information from the memory 120 and recording still image data.

In the camera shake correcting process, a predetermined region of already stored image data is recorded as still image data. This process may be performed anytime since realtime functionality is not particularly requested. For example, immediately after the image data, the shift values, the distortion correction values, and the region information are stored in the memory 120, the camera shake correcting process may be performed. In addition, after moving image capturing finishes, the camera shake correcting process may be performed.

The camera shake correcting process of the image interpolation unit 114 is described below with reference to the flowchart shown in FIG. 18.

In step S81, the image interpolation unit 114 acquires the image data stored in the memory 120 through the image interpolation unit 114. The image data read from the memory 120 is converted by the signal processing unit 113 into image data including a luminance signal and a color-difference signal. The converted data is supplied to the image interpolation unit 114. The image data supplied to the image interpolation unit 114 is temporarily supplied to the memory 117 under the control of the remote controller 116.

In step S82, the image interpolation unit 114 uses the signal processing unit 113 to acquire the modified region information, the limited shift values, and the limited distortion correction values, which are stored in the memory 120. The acquired region information, shift values, and distortion correction values are temporarily supplied to the memory 117 under the control of the remote controller 116.

In step S83, the image interpolation unit 114 determines a reading position of the image data on the basis of the region information, shift values, and distortion correction values stored in the memory 117. For example, when the image data acquired from the memory 120 is image data of the entirety of the effective pixel region 201 in FIG. 16, the image interpolation unit 114 determines the reading position of the image data on the basis of the region information, shift values, and distortion correction values acquired from the memory 120. For example, the still image region 303, which is represented by the region information, is shifted by the shift values acquired from the memory 120. The image interpolation unit 114 determines, as the reading position of each line, a position obtained such that the line included in the shifted still image region 302 is shifted by the distortion correction value for the line.

In step S84, the image interpolation unit 114 reads data (image data) at the determined reading position in the image data acquired from the memory 120. The image interpolation unit 114 performs processing, such as image size conversion, on the read image data, if necessary, and supplies the processed data to the recording medium (not shown).

For example, when the determined reading position (the still image region shifted on the basis of the shift and distortion correction values) represents the still image region 271 shown in FIG. 12, the image interpolation unit 114 reads and supplies image data of the still image region 271 to the recording medium (not shown).

In step S85, by controlling the recording medium, the image interpolation unit 114 records the supplied image data as image data of the still image captured during moving image capturing on the recording medium. After that, the camera shake correcting process finishes. Alternatively, by supplying the read image data to a display (not shown) without supplying the recording medium, the still image may be displayed.

As described above, after the image interpolation unit 114 acquires image data, region information, shift values, and distortion correction values from the memory 120, on the basis of the acquired image data, region information, shift values, and distortion correction values, image data is read and recorded on the recording medium.

As described above, by reading the image data on the basis of the data, region information, shift values, and distortion correction values, image data of a still image in which an effect of vibration due to camera shake is suppressed in units of lines can be recorded. This makes it possible to provide the user with a still image in which an effect of camera shake is corrected.

In the foregoing description, by operating the image processing apparatus 100 by the user to perform moving image capturing, a captured moving image is corrected concerning image instability due to camera shake. However, by operating the image processing apparatus 100 by the user, at the time of moving image capturing, it may be selected whether camera shake correction is to be performed for the moving image.

In addition, even if camera shake correction is not performed for the moving image at moving image capturing in response to a user's operation on the image processing apparatus 100, camera shake correction can be performed for a still image captured during moving image capturing.

A case in which the image processing apparatus 100 corrects camera shake only for a still image captured during moving image capturing without correcting camera shake for a moving image is described below.

Figure 19A:
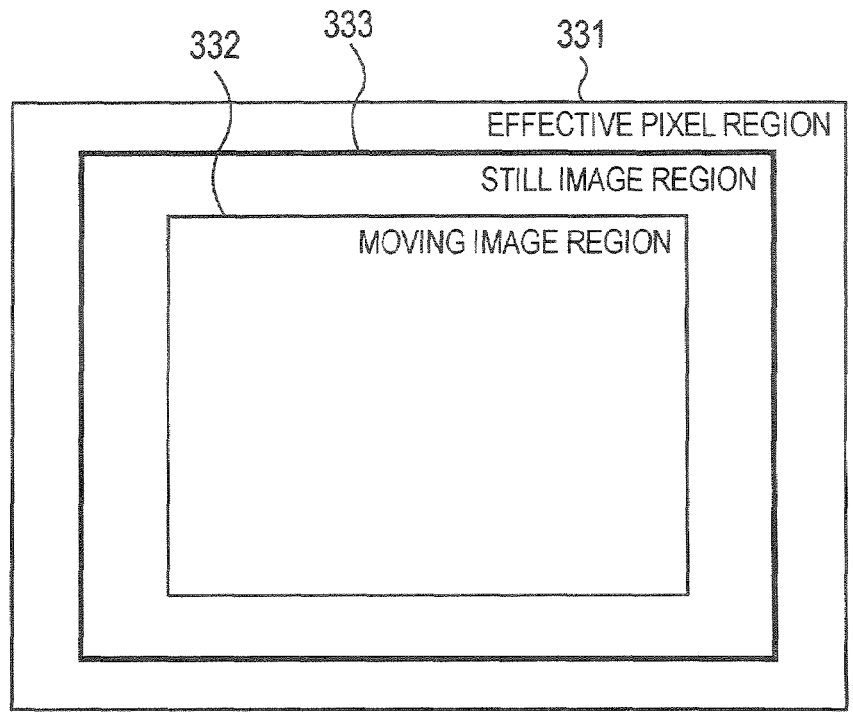
FIGS. 19A and 19B are illustrations of correction of a still image captured during moving image capturing.

For example, as shown in FIG. 19A, compared with an effective pixel region 331 of the image capturing device 111 in the image processing apparatus 100, a moving image region 332 is, to some extent, smaller, and a still image region 333 is slightly smaller than the effective pixel region 331.

The image processing apparatus 100 performs no camera shake correction for moving images. Thus, as shown in FIG. 19B, image data of the moving image region 332 is read as image data of each moving image field without calculating shift values and distortion correction values of the moving image region 332.

Conversely, the image processing apparatus 100 performs camera shake correction for still images. Thus, the amount (vibration value) of vibration applied to the image processing apparatus 100 is detected, and, on the basis of the result of detection, distortion correction values are calculated in units of lines of a still image region 333, whereby camera shake correction is performed.

Figure 19B:
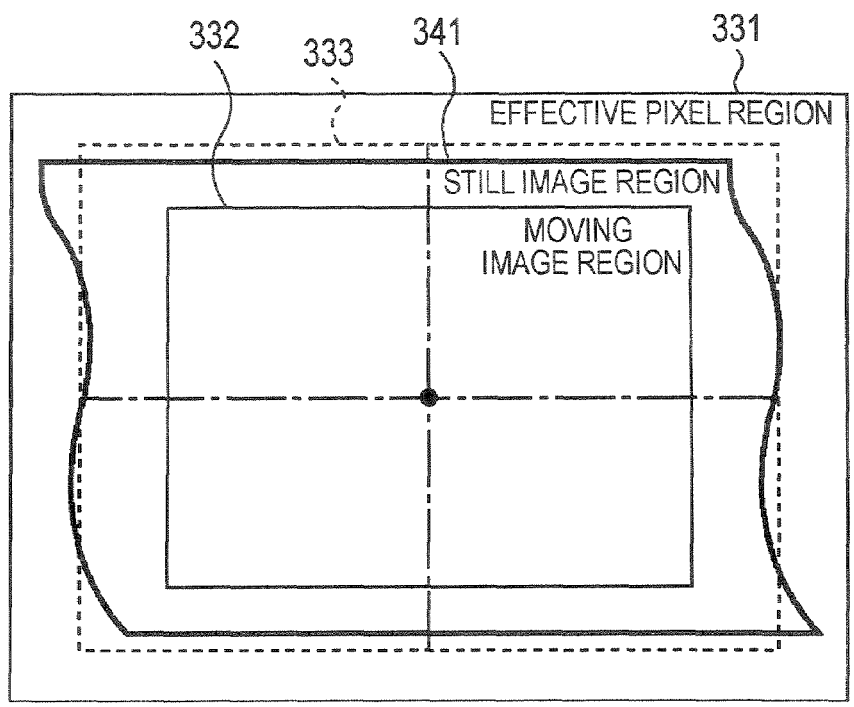

In the example shown in FIG. 19B, correction is only performed on the basis of the distortion correction values in units of lines of the still image region 333 without performing correction based on the shift values. In other words, the image processing apparatus 100 shifts each line included in the still image region 333 on the basis of the calculated distortion correction values for the line without shifting the still image region 333 on the basis of the shift values. This corrects still image distortion without shifting the position of the center of the still image region 333. In FIG. 19B, a region shifted on the basis of the distortion correction values for the still image region 333 serves as a still image region 341.

As described above, by shifting each line of the still image region 333 on the basis of the distortion correction values, still image distortion caused by camera shake can be corrected in a state in which the position of the center of the moving image region 332 coincides with the position of the center of the shifted still image region 341.

Figure 20A:
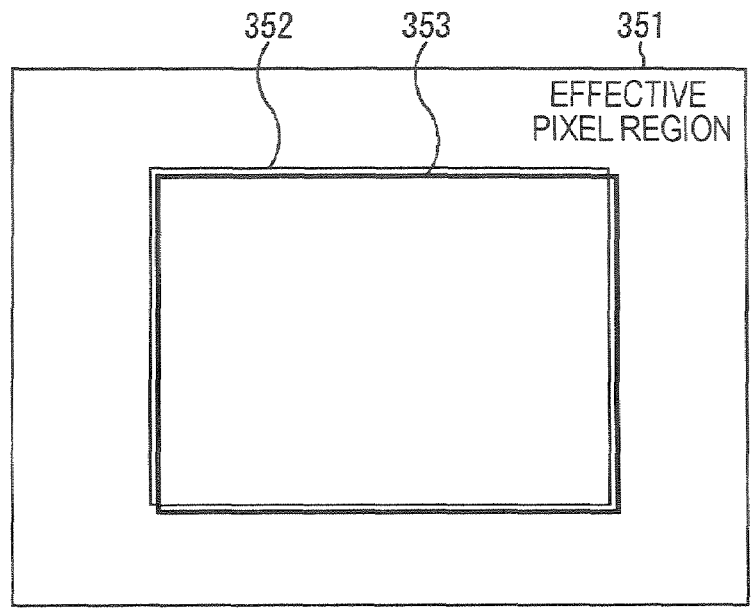
FIGS. 20A and 20B are illustrations of correction of a still image captured during moving image capturing.

As shown in FIG. 20A, in an effective pixel region 351, a moving image region 352 and a still image region 353 may be the same region. In FIG. 20A, in order that the moving image region 352 and the still image region 353 in the effective pixel region 351 may be easily viewed, the moving image region 352 and the still image region 353 are shown, with them slightly shifted in position.

Even if the moving image region 352 and the still image region 353 are the same region, similarly to the case shown in FIGS. 19A and 19B, the image processing apparatus 100 performs no camera shake correction for moving images. Thus, as shown in FIG. 20B, image data of the moving image region 352 is read as image data of each moving image field without calculating shift values and distortion correction values for the moving image region 352.

Conversely, the image processing apparatus 100 performs camera shake correction for still images. Thus, the image processing apparatus 100 detects the amount (vibration value) of vibration applied to the image processing apparatus 100. On the basis of the result of detection, the image processing apparatus 100 calculates distortion correction values in units of lines of the still image region 353.

Figure 20B:
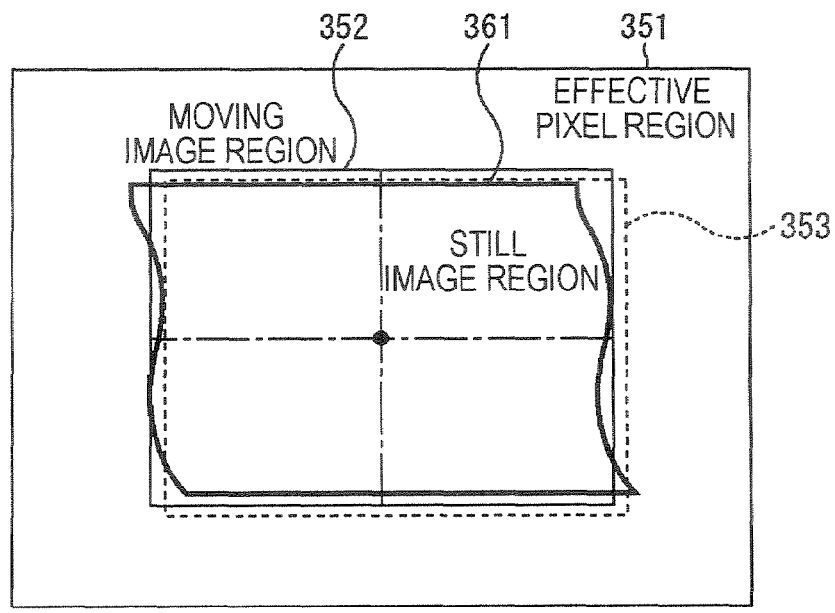

In the example shown in FIG. 20B, correction based on the distortion correction value for each line of the still image region 353 is only performed without performing correction based on shift values. In other words, each line of the still image region 353 is shifted on the basis of the calculated distortion correction values for the lines without shifting the still image region 353 on the basis of the shift values. This corrects still image distortion without shifting the position of the center of the still image region 353. In FIG. 20B, the shifted region based on the distortion correction values for the still image region 353 serves as a still image region 361.

As described above, by shifting each line of the still image region 353 on the basis of the distortion correction values, still image distortion caused by camera shake can be corrected in a state in which the position of the center of the moving image region 352 coincides with the position of the center of the still image region 361.

Next, a camera-shake-correction-value calculating process, performed by the image processing apparatus 100 when camera shake correction is performed only for a still image without performing camera shake correction for a moving image, is described below with reference to the flowchart shown in FIG. 21.

In step S111, the correction value calculation unit 119 acquires, from the vibration detection unit 118, (data of) the vibration values detected by the vibration detection unit 118. For example, as described with reference to FIG. 15, the correction value calculation unit 119 acquires vibration values in units of lines of the still image region.

In step S112, the correction value calculation unit 119 calculates distortion correction values in units of lines on the basis of the vibration values supplied from the vibration detection unit 118. For example, by performing processing similar to step S13 in FIG. 13, the correction value calculation unit 119 calculates distortion correction values in right, left, upward, and downward directions in FIG. 19A.

After calculating the distortion correction values, the correction value calculation unit 119 supplies the calculated distortion correction values to the memory 120. The correction value calculation unit 119 generates and supplies, to the memory 120, region information representing a predetermined still image region.

In step S113, the memory 120 stores the region information and distortion correction values supplied from the correction value calculation unit 119.

In step S114, the memory 120 stores the image data supplied from the effective pixel region 11 through the AFE 112. After that, the camera-shake-correction-value calculating process finishes. The image data supplied from the effective pixel region 11 is used as image data read from the entirety of the effective pixel region 331 in FIG. 19A.

In the above manner, the image processing apparatus 100 calculates distortion correction values for suppressing an effect of vibration due to camera shake.

As described above, by calculating only distortion correction values without calculating shift values, even if camera shake correction is performed only for a still image captured during moving image capturing, still image distortion caused by camera shake can be corrected in a state in which the position of the center of the still image coincides with the position of the center of the shifted still image region without performing camera shake correction for a moving image.

In addition, by comparing the camera-shake-correction-value calculating process in FIG. 13 and the camera-shake-correction-value calculating process in FIG. 21, it is indicated that, in the camera-shake-correction-value calculating process in FIG. 21, shift values for a still image region are not calculated. In addition, in the camera-shake-correction-value calculating process in FIG. 21, processing corresponding to step S17 in FIG. 13 is not performed. This is because it can be considered that, since shift values of the moving image region and the still image region are typically zeroes, a difference in shift value between the moving image region and the still image region is determined to be typically not equal to or greater than a threshold value, and the determination is omitted, thus resulting in no modification (the size of) of the still image region.

Next, a camera shake correcting process, performed by the image processing apparatus 100 when camera shake correction is performed only for a still image without performing camera shake correction for a moving image, is described below with reference to the flowchart shown in FIG. 22.

In step S141, the image interpolation unit 114 acquires the image data stored in the memory 120 through the signal processing unit 113. The image data read from the memory 120 is converted by the signal processing unit 113 into image data including a luminance signal and a color-difference signal, and the converted image data is supplied to the image interpolation unit 114. The image data supplied to the image interpolation unit 114 is temporarily supplied to the memory 117 under the control of the remote controller 116.

In step S142, the image interpolation unit 114 acquires the region information and distortion correction values stored in the memory 120 through the signal processing unit 113. The acquired region information and distortion correction values are temporarily supplied to the memory 117 under the control of the remote controller 116.

After that, steps S143 to S145 are performed, whereby still image data is read and recorded on the recording medium. Since steps S143 to S145 are identical to steps S83 to S85, respectively, their descriptions are omitted. In step S143, the image interpolation unit 114 determines a reading position of the still image data on the basis of the region information and distortion correction values acquired from the memory 120.

In the above manner, after the image interpolation unit 114 acquires the image data, the region information, and the distortion correction values from the memory 120, the image interpolation unit 114 reads still image data on the basis of the acquired region information and distortion correction values, and records the still image data on the recording medium.

As described above, by reading image data on the basis of region information and distortion correction values, still image data in which effects of vibration caused by camera shake are suppressed in units of lines can be recorded. This makes it possible to provide the user with a still image in which an effect of camera shake is corrected.

As described above, according to an embodiment of the present invention, a vibration value of vibration applied to the image processing apparatus 100 is detected, and shift values and distortion correction values are calculated and the calculated shift values and distortion correction values are limited. In addition, a still image region is modified if necessary so that the center of a still image region is closer in position to the center of a moving image region. Thus, when a still image is captured during moving image capturing, the position of the subject in the still image captured during moving image capturing can be made closer to the position of the subject confirmed by the user on the display screen of an image capturing apparatus, and the captured still image can be made more natural.

Although it is described that the image data is supplied from the AFE 112 to the memory 120, image data which includes a luminance signal and a color-difference signal and which is obtained by conversion in the signal processing unit 113 may be supplied and stored in the memory 120. In addition, instead of providing the memory 120, the image data, region information, shift values, distortion correction values to be supplied to the memory 120 in FIG. 16 may be stored in the memory 117.

In addition, after the region information, shift values, and distortion correction values calculated by the correction value calculation unit 119 are supplied to the TG 115, and the TG 115 controls the image capturing device 111 to read, from an effective pixel region, image data of a shifted still image region in which an effect of camera shake is suppressed, the read image data may be supplied to the AFE 112. In this case, camera shake correction performed by the image interpolation unit 114 is performed by the image capturing device 111.

Figure 23:
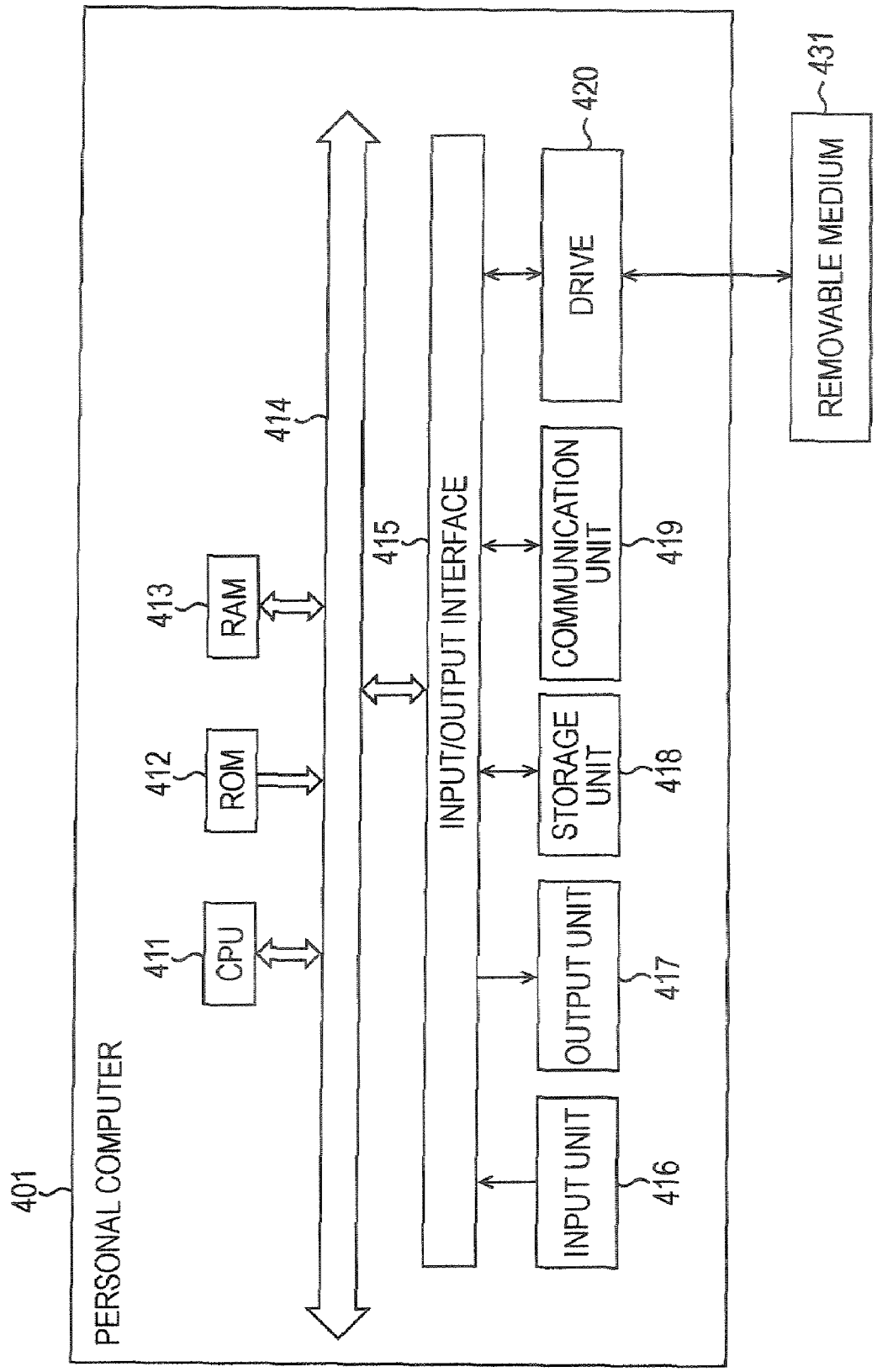
FIG. 23 is a block diagram showing an example of the configuration of a personal computer.

FIG. 23 is a block diagram showing an example of the configuration of a personal computer 401 for executing the above-described consecutive processing by using a program. A central processing unit (CPU) 411 in the personal computer 401 executes various types of processing in accordance with programs recorded in a read-only memory (ROM) 412 or a recording unit 418. A random access memory (RAM) 413 stores programs to be executed by the CPU 411, data, etc., if necessary. The CPU 411, the ROM 412, and the RAM 413 are mutually connected.

An input/output interface 415 is connected to the CPU 411 through a bus 414. The input/output unit 415 connects to an input unit 416 including a keyboard, a mouse, and a microphone, and an output unit 417 including a display and a speaker. The CPU 411 executes various types of processing in response to commands input from the input unit 416. The CPU 411 outputs processing results to the output unit 417.

The recording unit 418 connected to the input/output interface 415 is formed by, for example, a hard disk drive, and records therein programs to be executed by the CPU 411 and various types of data. A communication unit 419 communicates with an external apparatus through a network such as the Internet or a local area network.

In addition, the communication unit 419 may acquire and record a program in the recording unit 418.

A drive 420 is connected to the input/output interface 415. When a removable medium 431, such as a magnetic disk, an optical disc, a magneto-optical disc, or a semiconductor memory, is loaded into the drive 420, the drive 420 drives the removable medium 431 to acquire a program and data recorded on the removable medium 431. The acquired program and data are transferred and recorded in the recording unit 418, if necessary.

The above-described consecutive processing can be executed either by hardware or by software. When the above-described consecutive processing is executed by software, a program forming the software is installed from a program storage medium to a built-in computer of dedicated hardware or to, for example, a multi-purpose personal computer that can execute various functions by installing various programs.

Types of the program recording medium which has a program recorded therein that is made executable by a computer after being installed into the computer include the removable medium 431 shown in FIG. 23, which is a package medium formed by one of a magnetic disk (including a flexible disk), an optical disc (CD-ROM (compact disc read-only memory) or DVD (digital versatile disc)), a magneto-optical disc, and a semiconductor memory, the ROM 412, in which a program is temporarily or eternally stored, and the recording unit 418, which includes a hard disk. Storing of the program onto the program recording medium is performed by using a wired or wireless communication medium, such as a LAN, the Internet through the communication unit 419, which is an interface such as a router or a modem, if necessary.

In this specification, steps constituting a program recorded in the recording medium definitely include processing steps executed in a time-series manner in given order, and include processing steps which are executed in parallel or separately if they are not necessarily executed in a time-series manner.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   image capturing means for capturing a first image by using an image capturing device;
   detection means for detecting applied vibration and outputting a vibration value representing a magnitude of the vibration;
   calculation means for calculating a first correcting value and a second correcting value from the vibration value, the first correcting value representing a displacement for moving, in the first image, a position of a second image selectively output from the first image so that an effect of the vibration on the second image is suppressed, the second correcting value representing a displacement for moving, in the first image, a third image selectively output from the first image so that an effect of the vibration on the third image is suppressed;
   alteration means for altering, when a difference between the first correcting value and the second correcting value is equal to or greater than a predetermined threshold value, a region corresponding to the second image so as to reduce a distance between the center of a corrected second image and the center of a corrected third image, the corrected second image being obtained by correcting the second image on the basis of the first correcting value, the corrected third image being obtained by correcting the third image on the basis of the second correcting value; and
   correction means for correcting the second image on the basis of the first correcting value.

2. The image processing apparatus according to claim 1, wherein, when the calculated first correcting value is greater than a predetermined value, said calculation means uses the predetermined value as the first correcting value.

3. The image processing apparatus according to claim 1, wherein:
   said calculation means also calculates distortion correction values on the basis of the vibration value and the first correcting value so that an effect of distortion caused by the vibration in the second image is suppressed, the distortion correction values each representing a displacement for moving a position of each of lines of pixels included in the second image; and
   said correction means corrects the second image on the basis of the first correcting value and the distortion correction values.

4. The image processing apparatus according to claim 3, wherein, when one distortion correction value for a predetermined line of pixels included in the second image is greater than a predetermined value based on the first correcting value, said calculation means uses, as the distortion correction value for the predetermined line, the predetermined value based on the first correcting value.

5. The image processing apparatus according to claim 1, wherein:
   the third image is a still image used as a field of a moving image; and
   the second image is a still image captured during capturing of the moving image.

6. An image processing apparatus comprising:
   an image capturing unit capturing a first image by using an image capturing device;
   a detection unit detecting applied vibration and outputting a vibration value representing a magnitude of the vibration;
   a calculation unit calculating a first correcting value and a second correcting value from the vibration value, the first correcting value representing a displacement for moving, in the first image, a position of a second image selectively output from the first image so that an effect of the vibration on the second image is suppressed, the second correcting value representing a displacement for moving, in the first image, a third image selectively output from the first image so that an effect of the vibration on the third image is suppressed;
   an alteration unit altering, when a difference between the first correcting value and the second correcting value is equal to or greater than a predetermined threshold value, a region corresponding to the second image so as to reduce a distance between the center of a corrected second image and the center of a corrected third image, the corrected second image being obtained by correcting the second image on the basis of the first correcting value, the corrected third image being obtained by correcting the third image on the basis of the second correcting value; and
   a correction unit correcting the second image on the basis of the first correcting value.

7. An image processing method implemented by an image processing apparatus, the method comprising:
   capturing a first image by using an image capturing device of the image processing apparatus;
   detecting, at the image processing apparatus, applied vibration and outputting a vibration value representing a magnitude of the vibration;
   calculating, at the image processing apparatus, a first correcting value and a second correcting value from the vibration value, the first correcting value representing a displacement for moving, in the first image, a position of a second image selectively output from the first image so that an effect of the vibration on the second image is suppressed, the second correcting value representing a displacement for moving, in the first image, a third image selectively output from the first image so that an effect of the vibration on the third image is suppressed;
   when a difference between the first correcting value and the second correcting value is equal to or greater than a predetermined threshold value, altering, at the image processing apparatus, a region corresponding to the second image so as to reduce a distance between the center of a corrected second image and the center of a corrected third image, the corrected second image being obtained by correcting the second image on the basis of the first correcting value, the corrected third image being obtained by correcting the third image on the basis of the second correcting value; and correcting, at the image processing apparatus, the second image on the basis of the first correcting value.

* * * * *